US012561084B2

(12) United States Patent
Lee

(10) Patent No.: US 12,561,084 B2
(45) Date of Patent: Feb. 24, 2026

(54) COMPUTATIONAL STORAGE DEVICE CONFIGURED TO TRANSFER INTERMEDIATE DATA BETWEEN COMPUTE ENGINES AND METHOD FOR OPERATING THE DEVICE

(71) Applicant: Samsung Electronics Co., Ltd., Suwon-si (KR)

(72) Inventor: Jong Won Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 287 days.

(21) Appl. No.: 18/354,767

(22) Filed: Jul. 19, 2023

(65) Prior Publication Data

US 2024/0220151 A1      Jul. 4, 2024

(30) Foreign Application Priority Data

Jan. 3, 2023    (KR) ........................ 10-2023-0000554

(51) Int. Cl.
*G06F 3/06* (2006.01)
(52) U.S. Cl.
CPC .......... *G06F 3/0655* (2013.01); *G06F 3/0604* (2013.01); *G06F 3/0673* (2013.01)
(58) Field of Classification Search
None
See application file for complete search history.

(56) References Cited

U.S. PATENT DOCUMENTS 7,113,837 B2 *   9/2006   Takemoto ............. G06F 9/4415
                                                                710/1
8,250,341 B2     8/2012   Schulz et al.
(Continued)

FOREIGN PATENT DOCUMENTS

EP            4086746 A1     11/2022
WO      2021/195187 A1       9/2021

OTHER PUBLICATIONS

KhaledHammouda, "Namespace", Nov. 22, 2021, pp. 1-12, https://en.wikipedia.org/w/index.php?title=Namespace&oldid=1056578999 (Year: 2021).*
(Continued)

*Primary Examiner* — Christopher D Birkhimer
(74) *Attorney, Agent, or Firm* — Harness, Dickey & Pierce, P.L.C.

(57) ABSTRACT
A method for operating a computational storage device includes receiving, by a storage controller, a first computing namespace setting instruction from a first host device, receiving, by the storage controller, a second computing namespace setting instruction from a second host device, receiving, by the storage controller, a first program from the first host device, receiving, by the storage controller, a second program from the second host device, receiving, by the storage controller, a fused execution command processing, by a first accelerator, the first computation, storing, by the storage controller, a first computation result obtained by processing the first computation in a buffer memory, providing, by the storage controller, data stored in the buffer memory to a second accelerator different from the first accelerator and processing, by the second accelerator, the second computation on the data provided from the buffer memory.

20 Claims, 16 Drawing Sheets

1

(56) References Cited

U.S. PATENT DOCUMENTS

| | | | | |
|---|---|---|---|---|
| 8,755,221 | B2 | 6/2014 | Estakhri et al. | |
| 10,230,578 | B2* | 3/2019 | Ruggeri | H04L 63/0428 |
| 11,249,652 | B1 | 2/2022 | Kuzmin et al. | |
| 11,307,768 | B2 | 4/2022 | Spencer | |
| 2003/0097524 | A1* | 5/2003 | Brant | G06F 3/0659 |
| | | | | 711/143 |
| 2004/0136241 | A1 | 7/2004 | Rapp et al. | |
| 2006/0005074 | A1* | 1/2006 | Yanai | G06F 3/0619 |
| | | | | 714/6.32 |
| 2010/0146186 | A1* | 6/2010 | Traister | G11C 11/5628 |
| | | | | 711/E12.001 |
| 2010/0174866 | A1* | 7/2010 | Fujimoto | G06F 12/0246 |
| | | | | 711/170 |
| 2014/0068161 | A1* | 3/2014 | Yi | G06F 12/0246 |
| | | | | 711/103 |
| 2019/0042093 | A1 | 2/2019 | Adams et al. | |
| 2019/0066791 | A1* | 2/2019 | Papa | G06F 3/0604 |
| 2019/0391928 | A1 | 12/2019 | Lin | |
| 2020/0210335 | A1 | 7/2020 | Sundrani et al. | |
| 2020/0278893 | A1 | 9/2020 | Niell et al. | |
| 2021/0318828 | A1 | 10/2021 | Valtonen | |
| 2022/0147363 | A1 | 5/2022 | Moloney et al. | |
| 2023/0066863 | A1* | 3/2023 | Li | G06F 12/0246 |
| 2023/0195350 | A1* | 6/2023 | Muchherla | G06F 3/065 |
| | | | | 711/154 |
| 2023/0291709 | A1* | 9/2023 | Han | H04L 63/0227 |

OTHER PUBLICATIONS

Milecia, "Namespaces Quickly Explained", Aug. 26, 2019, pp. 1-6, https://dev.to/flippedcoding/namespaces-quickly-explained-1em0#:~:text=To%20put%20it%20simply%2C%20a,can%20have%20nested%20namespaces%20too. (Year: 2019).*

European Search Report issued Apr. 12, 2024 in European Application No. 23208574.6.

* cited by examiner

FBIT

CMD1

0

CMD2

1

CMD3

1

CMD4

0

COMPUTATIONAL STORAGE DEVICE CONFIGURED TO TRANSFER INTERMEDIATE DATA BETWEEN COMPUTE ENGINES AND METHOD FOR OPERATING THE DEVICE

CROSS-REFERENCE TO RELATED APPLICATION

This application claims priority from Korean Patent Application No. 10-2023-0000554 filed on Jan. 3, 2023 in the Korean Intellectual Property Office, and all the benefits accruing therefrom under 35 U.S.C. 119, the contents of which in its entirety are herein incorporated by reference.

BACKGROUND

1. Technical Field

The present disclosure relates to computational storage devices and methods for operating the computational storage devices.

2. Description of the Related Art

Semiconductor memory devices include volatile memory devices and nonvolatile memory devices. The volatile memory devices may lose their stored contents when powered off, while they have high read and write speeds. Conversely, since the nonvolatile memory devices retain their stored contents even when powered off, the nonvolatile memory devices are used to store contents that need (or are desired) to be maintained regardless of whether power is supplied or not.

For example, the volatile memory device includes a static RAM (SRAM), a dynamic RAM (DRAM), a synchronous DRAM (SDRAM), or the like. The nonvolatile memory devices retain their stored contents even when powered off. For example, the nonvolatile memory devices include a read only memory (ROM), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and the like. Flash memories may be classified into NOR flash memory and NAND flash memory.

SUMMARY

Example embodiments of the present disclosure provide a computational storage device having an improved operation performance and a method for operating the device.

However, example embodiments of the present disclosure are not restricted to the one set forth herein. The above and other aspects of the present disclosure will become more apparent to one of ordinary skill in the art to which the present disclosure pertains by referencing the detailed description of the present disclosure given below.

According to an example embodiment of the present disclosure, there is provided a method for operating a computational storage device, comprising receiving, by a storage controller, a first computing namespace setting instruction from a first host device, receiving, by the storage controller, a second computing namespace setting instruction from a second host device, receiving, by the storage controller, a first program from the first host device, receiving, by the storage controller, a second program from the second host device, receiving, by the storage controller, a fused execution command, the fused execution command indicating to process first computation using the first program in the first computing namespace and, indicating to in response to a first computation result of processing the first computation, process second computation using the second program in the second computing namespace, processing, by a first accelerator, the first computation, storing, by the storage controller, in a buffer memory the first computation result obtained by processing the first computation, providing, by the storage controller, data stored in the buffer memory to a second accelerator different from the first accelerator, in response to an amount of data stored in the buffer memory exceeding a range and processing, by the second accelerator, the second computation on the data provided from the buffer memory.

According to another example embodiment of the present disclosure, there is provided a computational storage device comprising a nonvolatile memory configured to store data, a storage controller configured to control the nonvolatile memory, a first accelerator comprised in a first computing namespace, and configured to process first computation according to a first execution command received from a first host device on the data by using a first program provided from the first host device and a second accelerator comprised in a second computing namespace, and configured to process second computation according to a second execution command received from a second host device on the data by using a second program provided from the second host device, wherein the storage controller is configured to receive a fused execution command, the fused execution command indicating to process the first computation using the first program in the first computing namespace and indicating to, in response to a first computation result of processing the first computation, process the second computation using the second program in the second computing namespace, control the first accelerator such that the first computation is processed on the data, store in a buffer memory a first computation result obtained by processing the first computation in a buffer memory, provide data stored in the buffer memory to the second accelerator, in response to an amount of data stored in the buffer memory exceeding a range, and control the second accelerator such that the second computation is processed on the data stored in the buffer memory.

According to another example embodiment of the present disclosure, there is provided a computational storage device comprising a nonvolatile memory configured to store data, a storage controller configured to control the nonvolatile memory, a first accelerator in a first computing namespace, and configured to process first computation according to a first execution command received from a first host device on the data by using a first program provided from the first host device, a second accelerator in a second computing namespace, and configured to process second computation according to a second execution command received from a second host device on the data by using a second program provided from the second host device and a volatile memory configured to store at least a part of data stored in the nonvolatile memory, wherein the storage controller is configured to receive a fused execution command, the fused execution command indicating to process the first computation using the first program in the first computing namespace and indicating to, in response to the first computation result of processing the first computation, process the second computation using the second program in the second computing namespace, control the first accelerator such that the first computation is processed on the data stored in the volatile memory, store the first computation result obtained by processing the first computation in a buffer memory different from the volatile memory, provide data stored in the buffer memory to the second accelerator, in response to an amount of data stored in the buffer memory exceeding a range, control the second accelerator such that the second computation is processed on the data stored in the buffer memory, and store a computation result obtained by processing the second computation in the volatile memory.

BRIEF DESCRIPTION OF THE DRAWINGS

The above and other aspects and features of the present disclosure will become more apparent by describing in detail example embodiments thereof with reference to the attached drawings, in which:

FIG. 1 is a block diagram of a memory system according to some example embodiments;

FIG. 3 is a block diagram of the storage controller and the nonvolatile memory of FIG. 1;

FIGS. 11 to 14 are diagrams for explaining the operation of the memory system shown in FIG. 10;

DETAILED DESCRIPTION OF THE EXAMPLE EMBODIMENTS

Figure 2:
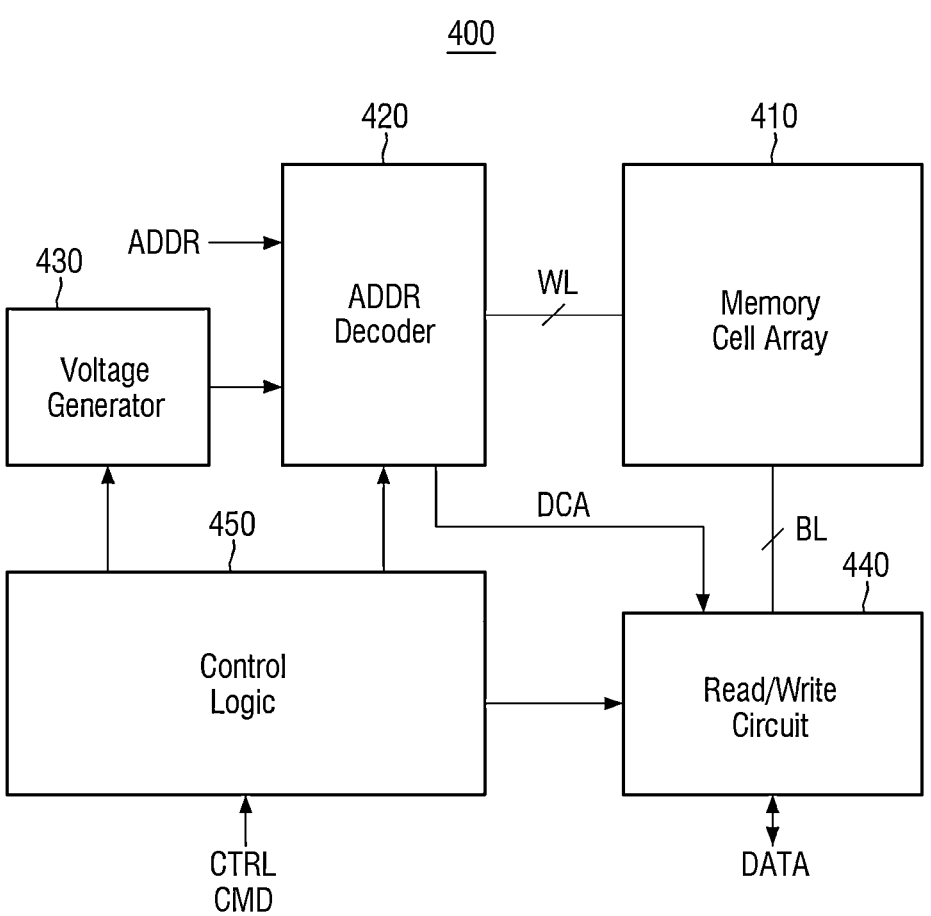
FIG. 2 is a block diagram of the nonvolatile memory of FIG. 1.

Hereinafter, example embodiments according to the technical spirit of the present disclosure will be described with reference to the accompanying drawings.

Figure 1:
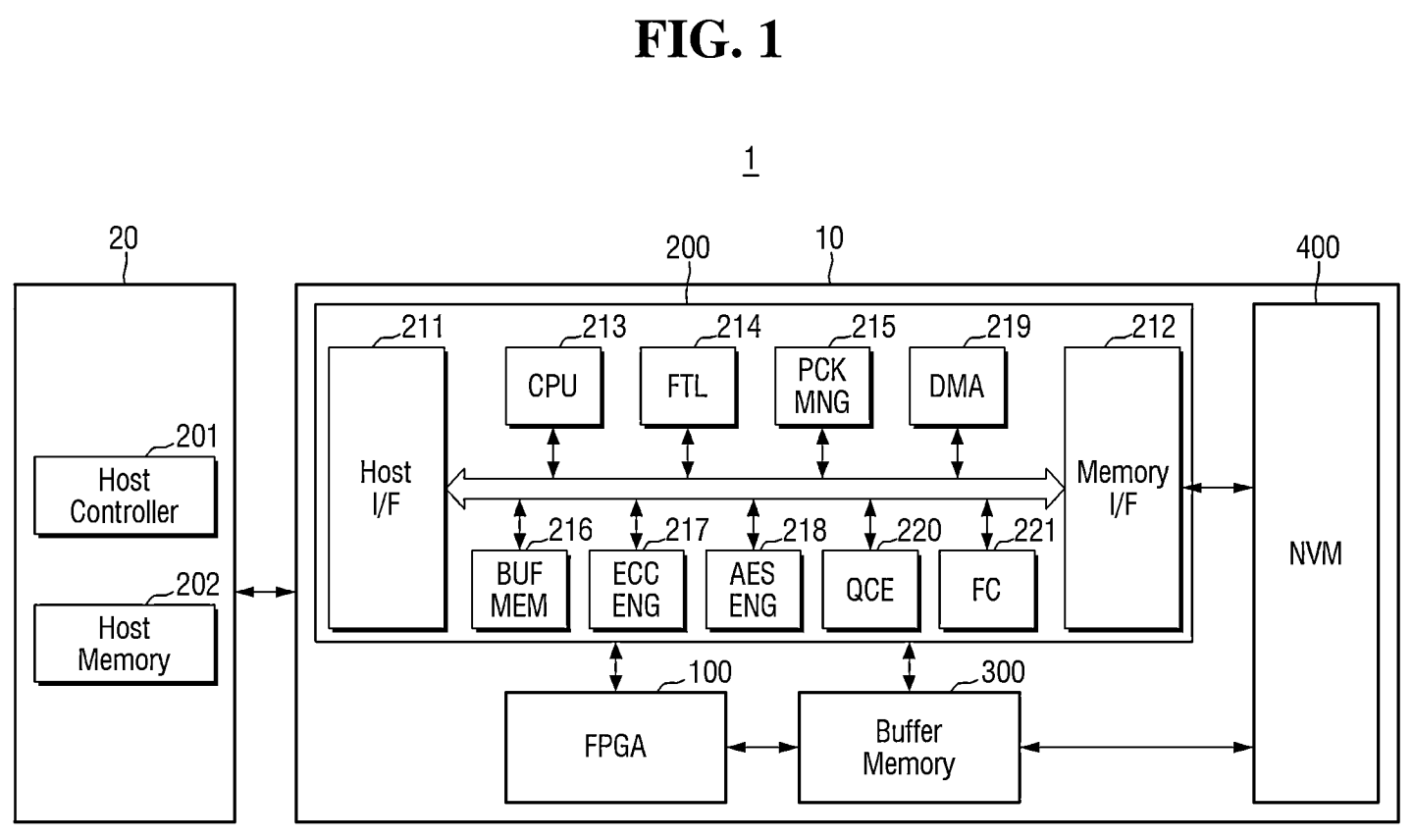

FIG. 1 is a block diagram of a memory system according to some example embodiments.

Referring to FIG. 1, a memory system 1 may include a host device 20 and a storage device 10.

The host device 20 may include a host controller 201 and a host memory 202. The host controller 201 may control the overall operation of the host device 20. In some example embodiments, the host controller 201 may include a plurality of entities or tenants driven by a plurality of virtual machines (VM). The entities or tenants driven by different virtual machines may independently control the storage device 10.

The host memory 202 may temporarily store data transmitted from the outside, data to be transmitted to the storage device 10, or data transmitted from the storage device 10. In some example embodiments, the host device 20 may be implemented as an application processor (AP). However, the example embodiment is not limited thereto.

The storage device 10 may be, for example, a computational storage device.

The storage device 10 may include an Field Programmable Gate Array (FPGA) 100, a storage controller 200, a buffer memory 300, and a nonvolatile memory 400.

The storage device 10 may include storage media for storing data according to a request from the host device 20. As one example, the storage device 10 may include at least one of a solid state drive (SSD), an embedded memory, or a removable external memory. When the storage device 10 is the SSD, the storage device 10 may be a device conforming to the nonvolatile memory express (NVMe) standard. When the storage device 10 is the embedded memory or the external memory, the storage device 10 may be a device conforming to the universal flash storage (UFS) standard or the embedded multi-media card (eMMC) standard. The storage device 10 and the host device 20 may each generate and transmit a packet conforming to an adopted standard protocol.

When the nonvolatile memory 400 of the storage device 10 includes a flash memory, the flash memory may include a 2D NAND memory array or a 3D (or vertical) NAND (VNAND) memory array. As another example, the storage device 10 may include various other types of nonvolatile memories. For example, a magnetic RAM (MRAM), a spin-transfer torque MRAM, a conductive bridging RAM (CBRAM), a ferroelectric RAM (FeRAM), a phase RAM (PRAM), a resistive memory (resistive RAM) and various other types of memories may be applied to the storage device 10.

The FPGA 100 may perform various types of computations, calculations, and the like on data stored in the buffer memory 300. In some example embodiments, the FPGA 100 may include a plurality of accelerators that perform various types of computations, calculations, and the like on the data stored in the buffer memory 300 based on the execute command provided from the host device 20.

The FPGA 100 may perform computation using data temporarily stored in the buffer memory 300 by using the algorithm mapped to a hardware logic configuration. In some example embodiments, the FPGA 100 may perform computation using data stored in the nonvolatile memory 400 without intervention of the host device 20.

The storage controller 200 may include a host interface (I/F) 211, a memory interface (I/F) 212, and a central processing unit (CPU) 213. In addition, the storage controller 200 may further include a flash translation layer (FTL) 214, a packet manager (PCK MNG) 215, a buffer memory (BUF MEM) 216, an error correction code (ECC) engine 217, an advanced encryption standard (AES) engine (AES ENG) 218, a direct memory access (DMA) engine 219, a queue control engine (QCE) 220, and a flow controller (FC) 221.

The storage controller 200 may further include a working memory in which the flash translation layer (FTL) 214 is loaded, and data write and read operations to the nonvolatile memory (NVM) 400 may be controlled by the CPU 213 executing the flash translation layer.

The host interface 211 may transmit and receive a packet to and from the host device 20. The packet transmitted from the host device 20 to the host interface 211 may include a command or data to be written to the nonvolatile memory 400, or the like, and the packet transmitted from the host interface 211 to the host device 20 may include a response to the command, data read from the nonvolatile memory 400, or the like.

The memory interface 212 may transmit data to be written to the nonvolatile memory 400 or may receive data read from the nonvolatile memory 400. The memory interface 212 may be implemented to conform to standard conventions such as Toggle or open NAND flash interface (ONFI).

The flash translation layer 214 may perform various functions such as address mapping, wear-leveling, and garbage collection. Restated, the flash translation layer 214 may be configured to perform address mapping, wear-leveling, and garbage collection. The address mapping operation is an operation of converting a logical address received from the host device 20 into a physical address used to actually store data in the nonvolatile memory 400. The wear-leveling is a technique for preventing or reducing excessive deterioration of a specific block by equally using blocks in the nonvolatile memory 400. For example, the wear-leveling may be implemented by a firmware technique for balancing erase counts of physical blocks. The garbage collection is a technique for ensuring an available capacity in the nonvolatile memory 400 by copying valid data of a block to a new block and then erasing the existing block.

The packet manager 215 may generate a packet corresponding to the protocol of the interface agreed with the host device 20, or may parse various information from the packet received from the host device 20.

The buffer memory 216 may temporarily store data to be written to the nonvolatile memory 400 or data to be read from the nonvolatile memory 400. The buffer memory 216 may be provided in the storage controller 200, or may be provided outside the storage controller 200.

The ECC engine 217 may perform an error detection and correction function for the data read from the nonvolatile memory 400. Specifically, the ECC engine 217 may generate parity bits for data to be written to the nonvolatile memory 400, and the parity bits generated as described above may be stored in the nonvolatile memory 400 together with the write data. When reading data from the nonvolatile memory 400, the ECC engine 217 may correct the error of the read data using the parity bits read from the nonvolatile memory 400 together with the read data, and may output the read data of which the error has been corrected.

The AES engine 218 may perform at least one of an encryption operation or a decryption operation for data inputted to the storage controller 200 using a symmetric-key algorithm.

The DMA engine 219 may read or fetch data blocks from the buffer memory 300 so that the accelerator of the FPGA 100 may perform computation. Although it is illustrated in the drawing that the DMA engine 219 is included in the storage controller 200, the example embodiments are not limited thereto, and the DMA engine 219 may be implemented inside the FPGA 100, or may be implemented outside the storage controller 200.

The queue control engine 220 may manage the execute command provided from the host device 20. The queue control engine 220 may select an accelerator to process computation according to the execution command provided from the host device 20 among a plurality of accelerators included in the storage device 10, and may control the selected accelerator to process the computation according to the execution command. A specific operation thereof will be described later.

Although it is illustrated in the drawing that the queue control engine 220 is included in the storage controller 200, the example embodiments are not limited thereto, and the queue control engine 220 may be implemented inside the FPGA 100, or may be implemented outside the storage controller 200.

The flow controller 221 may be used when the execution command provided from the host device 20 is a fused execution command. When the execution command provided from the host device 20 is a fused execution command, for example, a plurality of computational processes according to the fused execution command may be performed at a high speed while minimizing or reducing access to the buffer memory 300 by the flow controller 221.

Although it is illustrated in the drawings the flow controller 221 is an additional component separate from the DMA engine 219, the example embodiments are not limited thereto, and the flow controller 221 may be implemented while being integrated with the DMA engine 219, if necessary. A detailed description of the flow controller 221 will be made later.

The buffer memory 300 may buffer data stored in the nonvolatile memory 400. Further, the buffer memory 300 may buffer data transferred from the FPGA 100 (e.g., data that has been subjected to the computational process by an accelerator). That is, when the FPGA 100 uses the data stored in the nonvolatile memory 400, the buffer memory 300 may temporarily store it so that the FPGA 100 may use the data stored in the nonvolatile memory 400. In some example embodiments, the buffer memory 300 may include, for example, a volatile memory such as a dynamic random access memory (DRAM), but the example embodiments are not limited thereto.

The nonvolatile memory 400 may store the data provided from the host device 20 and the data required (or alternatively, used) when the FPGA 100 performs computation. Hereinafter, an example embodiment of the nonvolatile memory 400 will be described in more detail.

FIG. 2 is a block diagram of the nonvolatile memory of FIG. 1.

Referring to FIG. 2, the nonvolatile memory 400 may include a memory cell array 410, an address decoder (ADDR Decoder) 420, a voltage generator 430, a read/write circuit 440, a control logic circuit 450, and the like.

The memory cell array 410 may be connected to the address decoder 420 through word lines WL. The memory cell array 410 may be connected to the read/write circuit 440 through bit lines BL. The memory cell array 410 may include a plurality of memory cells. For example, memory cells arranged in a row direction may be connected to the same word line WL, and memory cells arranged in a column direction may be connected to the same bit line BL.

The address decoder 420 may be connected to the memory cell array 410 through the word lines WL. The address decoder 420 may operate under the control of the control logic circuit 450. The address decoder 420 may receive the address ADDR from the storage controller 200. The address decoder 420 may receive from the voltage generator 430 a voltage required (or alternatively, used) for an operation such as program or read.

The address decoder 420 may decode a row address among the received addresses ADDR. The address decoder 420 may select the word line WL using the decoded row address. A decoded column address DCA may be provided to the read/write circuit 440. For example, the address decoder 420 may include a row decoder, a column decoder, an address buffer, and the like.

The voltage generator 430 may generate a voltage required (or alternatively, used) for an access operation under the control of the control logic circuit 450. For example, the voltage generator 430 may generate a program voltage and a program verification voltage which are required (or alternatively, used) to perform a program operation. For example, the voltage generator 430 may generate read voltages required (or alternatively, used) to perform a read operation, and generate an erase voltage and an erase verification voltage required (or alternatively, used) to perform an erase operation. In addition, the voltage generator 430 may provide a voltage required (or alternatively, used) to perform each operation to the address decoder 420.

The read/write circuit 440 may be connected to the memory cell array 410 through the bit lines BL. The read/write circuit 440 may exchange the data DATA with the storage controller 200. The read/write circuit 440 may operate under the control of the control logic circuit 450. The read/write circuit 440 may receive the decoded column address DCA from the address decoder 420. The read/write circuit 440 may select the bit line BL using the decoded column address DCA.

For example, the read/write circuit 440 may program the received data DATA into the memory cell array 410. The read/write circuit 440 may read data from the memory cell array 410 and provide the read data to the outside (e.g., the storage controller 200). For example, the read/write circuit 440 may include components such as a sense amplifier, a write driver, a column select circuit, a page buffer, and the like. That is, the read/write circuit 440 may buffer the data DATA received from the storage controller 200 in a page buffer, and program the buffered data DATA into the memory cell array 410.

The control logic circuit 450 may be connected to the address decoder 420, the voltage generator 430, and the read/write circuit 440. The control logic circuit 450 may control the operation of the nonvolatile memory 400. The control logic circuit 450 may operate in response to the control signal CRTL and the command CMD (e.g., write command and read command) provided from the storage controller 200.

Figure 3:
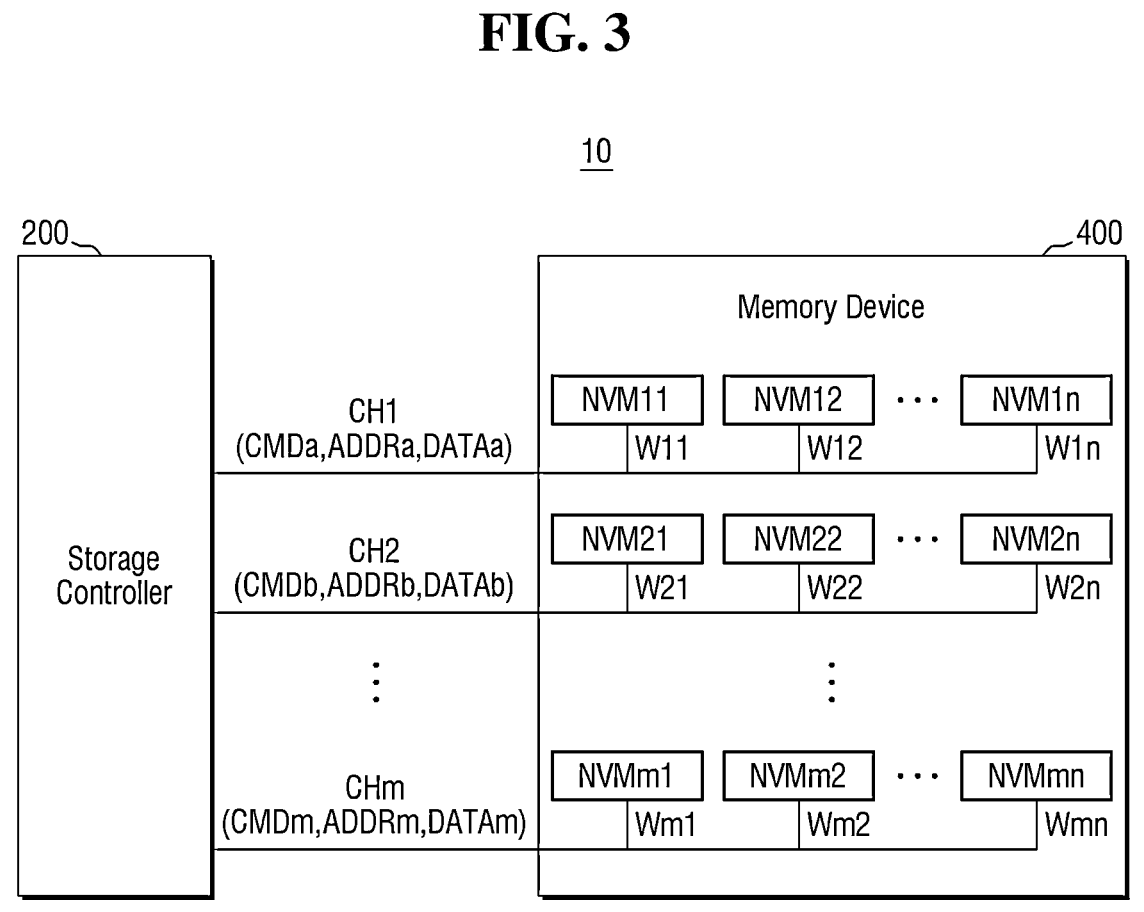

FIG. 3 is a block diagram of the storage controller and the nonvolatile memory of FIG. 1.

Referring to FIG. 3, the storage device 10 may include the storage controller 200 and the nonvolatile memory 400. The storage device 10 may support a plurality of channels CH1 to CHm, and the storage controller 200 and the nonvolatile memory 400 may be connected by the plurality of channels CH1 to CHm. For example, the storage device 10 may be implemented as a storage device such as a solid state drive (SSD).

The nonvolatile memory 400 may include a plurality of nonvolatile memory devices NVM11 to NVMmn. Each of (or alternatively, at least one of) the nonvolatile memory devices NVM11 to NVMmn may be connected to one of the plurality of channels CH1 to CHm through a corresponding way. For example, the nonvolatile memory devices NVM11 to NVM1n may be connected to a first channel CH1 through ways W11 to W1n, and the nonvolatile memory devices NVM21 to NVM2n may be connected to a second channel CH2 through ways W21 to W2n. In an example embodiment, each of (or alternatively, at least one of) the nonvolatile memory devices NVM11 to NVMmn may be implemented as an arbitrary memory unit capable of operating according to an individual command from the storage controller 200. For example, each of (or alternatively, at least one of) the nonvolatile memory devices NVM11 to NVMmn may be implemented as a chip or a die, but the present disclosure is not limited thereto.

The storage controller 200 may transmit and receive signals to and from the nonvolatile memory 400 through the plurality of channels CH1 to CHm. For example, the storage controller 200 may transfer commands CMDa to CMDm, addresses ADDRa to ADDRm, and data DATAa to DATAm to the nonvolatile memory 400 through the channels CH1 to CHm, or may receive data DATAa to DATAm from the nonvolatile memory 400.

The storage controller 200 may select one of the nonvolatile memory devices connected to the corresponding channel through the channels, and may transmit and receive signals to and from the selected nonvolatile memory device. For example, the storage controller 200 may select the nonvolatile memory device NVM11 among the nonvolatile memory devices NVM11 to NVM1n connected to the first channel CH1. The storage controller 200 may transmit the command CMDa, the address ADDRa, and the data DATAa to the selected nonvolatile memory device NVM11 through the first channel CH1, or may receive the data DATAa from the selected nonvolatile memory device NVM11.

The storage controller 200 may transmit and receive signals to and from the nonvolatile memory 400 in parallel through different channels. For example, the storage controller 200 may transmit the command CMDb to the nonvolatile memory 400 through the second channel CH2 while transmitting the command CMDa to the nonvolatile memory 400 through the first channel CH1. For example, the storage controller 200 may receive the data DATAb from the nonvolatile memory 400 through the second channel CH2 while receiving the data DATAa from the nonvolatile memory 400 through the first channel CH1.

The storage controller 200 may control the overall operation of the nonvolatile memory 400. The storage controller 200 may control each of (or alternatively, at least one of) the nonvolatile memory devices NVM11 to NVMmn connected to the channels CH1 to CHm by transmitting signals to the channels CH1 to CHm. For example, the storage controller 200 may control the selected one of the nonvolatile memory devices NVM11 to NVM1n by transmitting the command CMDa and the address ADDRa to the first channel CH1.

Each of (or alternatively, at least one of) the nonvolatile memory devices NVM11 to NVMmn may operate under the control of the storage controller 200. For example, the nonvolatile memory device NVM11 may program the data DATAa according to the command CMDa, the address ADDRa, and the data DATAa provided to the first channel CH1. For example, the nonvolatile memory device NVM21 may read the data DATAb according to the command CMDb and the address ADDRb provided to the second channel CH2, and may transfer the read data DATAb to the storage controller 200.

Although FIG. 3 illustrates that the nonvolatile memory 400 communicates with the storage controller 200 through m channels and includes n nonvolatile memory devices corresponding to the channels, the number of channels and the number of nonvolatile memory devices connected to one channel may be variously changed.

Figure 4:
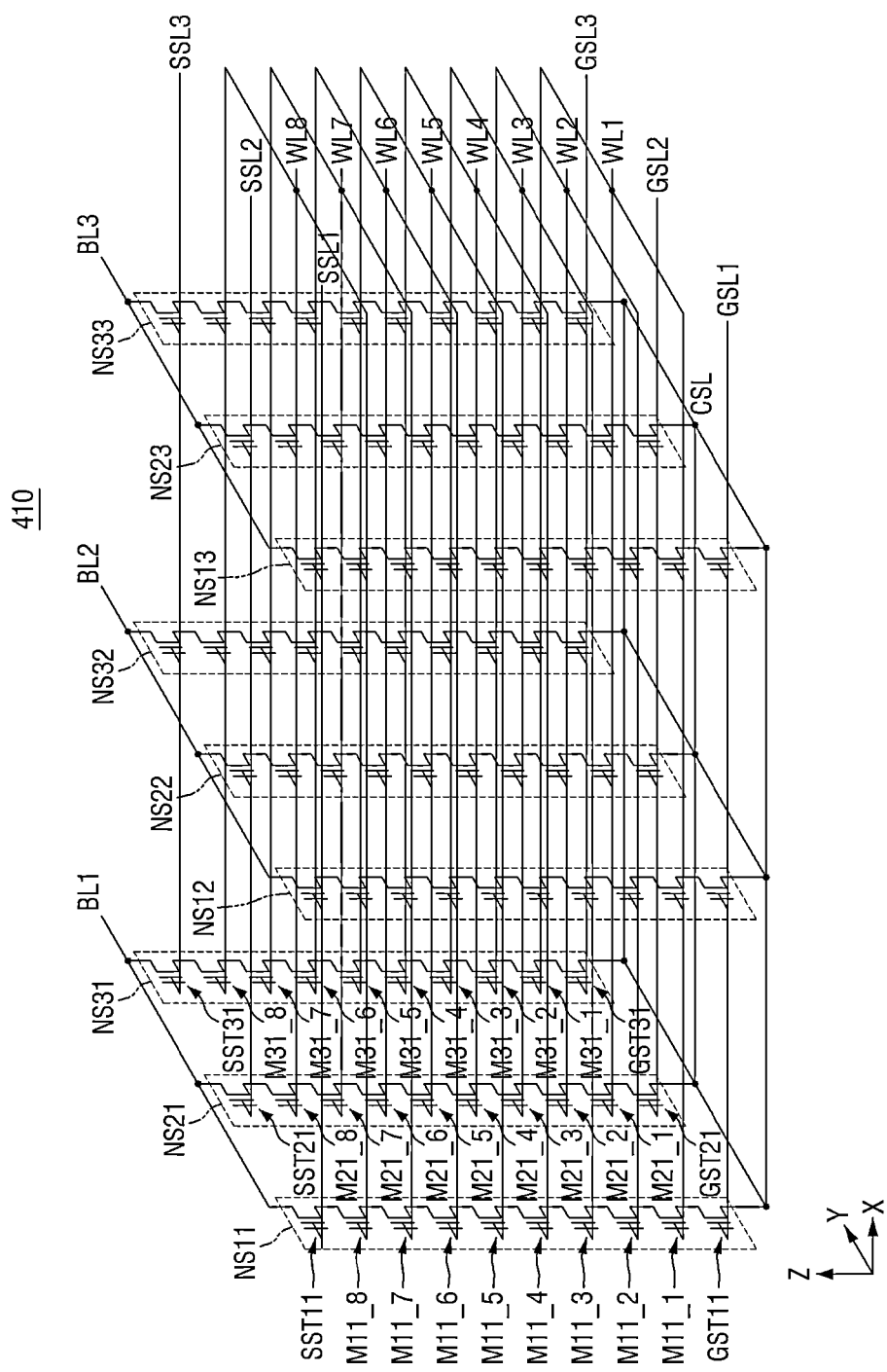
FIG. 4 is an example circuit diagram illustrating the memory cell array of FIG. 2.

FIG. 4 is an example circuit diagram illustrating the memory cell array of FIG. 2.

Referring to FIG. 4, a plurality of cell strings NS11, NS21, NS31, NS12, NS22, NS32, NS13, NS23, and NS33 may be arranged in a first direction x and a second direction y on a substrate. The plurality of cell strings NS11, NS21, NS31, NS12, NS22, NS32, NS13, NS23, and NS33 may have a shape extending in a third direction z. The plurality of cell strings NS11, NS21, NS31, NS12, NS22, NS32, NS13, NS23, and NS33 may be connected in common to a common source line CSL formed on or in the substrate.

The common source line CSL is shown as being connected to the lowermost end of the plurality of cell strings NS11, NS21, NS31, NS12, NS22, NS32, NS13, NS23, and NS33 in the third direction z. However, it is sufficient that the common source line CSL is electrically connected to the lowermost end of the plurality of cell strings NS11, NS21, NS31, NS12, NS22, NS32, NS13, NS23, and NS33 in the third direction z, and the common source line CSL is not limited to being physically located at the lower end of the plurality of cell strings NS11, NS21, NS31, NS12, NS22, NS32, NS13, NS23, and NS33. In addition, the plurality of cell strings NS11, NS21, NS31, NS12, NS22, NS32, NS13, NS23, and NS33 are shown to be arranged in a 3×3 array in this drawing, but the arrangement shape and the number of the plurality of cell strings arranged in the memory cell array 410 are not limited thereto.

Some of the cell strings NS11, NS12, and NS13 may be connected to a first ground select line GSL1. Some of the cell strings NS21, NS22, and NS23 may be connected to a second ground select line GSL2. Some of the cell strings NS31, NS32, and NS33 may be connected to a third ground select line GSL3.

In addition, some of the cell strings NS11, NS12, and NS13 may be connected to a first string select line SSL1. Some of the cell strings NS21, NS22, and NS23 may be connected to a second string select line SSL2. Some of the cell strings NS31, NS32, and NS33 may be connected to a third string select line SSL3.

Each of (or alternatively, at least one of) the plurality of cell strings NS11, NS21, NS31, NS12, NS22, NS32, NS13, NS23, and NS33 may include a string select transistor SST connected to each of (or alternatively, at least one of) the string select lines. In addition, each of (or alternatively, at least one of) the plurality of cell strings NS11, NS21, NS31, NS12, NS22, NS32, NS13, NS23, and NS33 may include a ground select transistor GST connected to each of (or alternatively, at least one of) the ground select lines.

One end of the ground select transistor in each of (or alternatively, at least one of) the plurality of cell strings NS11, NS21, NS31, NS12, NS22, NS32, NS13, NS23, and NS33 may be connected to the common source line CSL. In addition, each of (or alternatively, at least one of) the plurality of cell strings NS11, NS21, NS31, NS12, NS22, NS32, NS13, NS23, and NS33 may have a plurality of memory cells sequentially stacked in the third direction z between the ground select transistor and the string select transistor. Although not shown in the drawing, each of (or alternatively, at least one of) the plurality of cell strings NS11, NS21, NS31, NS12, NS22, NS32, NS13, NS23, and NS33 may include dummy cells between the ground select transistor and the string select transistor. In addition, the number of the string select transistors included in each string is not limited to this drawing.

For example, the cell string NS11 may include a ground select transistor GST11 disposed at the lowermost end in the third direction z, a plurality of memory cells M11_1 to M11_8 sequentially stacked on the ground select transistor GST11 in the third direction z, and a string select transistor SST11 stacked on the uppermost memory cell M11_8 in the third direction z. In addition, the cell string NS21 may include a ground select transistor GST21 disposed at the lowermost end in the third direction z, a plurality of memory cells M21_1 to M21_8 sequentially stacked on the ground select transistor GST21 in the third direction z, and a string select transistor SST21 stacked on the uppermost memory cell M21_8 in the third direction z. In addition, the cell string NS31 may include a ground select transistor GST31 disposed at the lowermost end in the third direction z, a plurality of memory cells M31_1 to M31_8 sequentially stacked on the ground select transistor GST31 in the third direction z, and a string select transistor SST31 stacked on the uppermost memory cell M31_8 in the third direction z. The configuration of the other strings may also be similar thereto.

The memory cells positioned at the same height in the third direction z from the substrate or the ground select transistor may be electrically connected in common through each word line. For example, the memory cells formed at the same height as the memory cells M11_1, M21_1, and M31_1 may be connected to a first word line WL1. In addition, the memory cells formed at the same height as the memory cells M11_2, M21_2, and M31_2 may be connected to a second word line WL2. Hereinafter, since the arrangement and structure of the memory cells connected to a third word line WL3 to an eighth word line WL8 are similar to or the same as the above, a description thereof will be omitted.

One end of each string select transistor of the plurality of cell strings NS11, NS21, NS31, NS12, NS22, NS32, NS13, NS23, and NS33 may be connected to a bit line BL1, BL2, or BL3. For example, the string select transistors SST11, SST21, and SST31 may be connected to the bit line BL1 extending in the second direction y. A description of the other string select transistors connected to the bit lines BL2 or BL3 is also similar to or the same as the above, and thus a description thereof will be omitted.

The memory cells corresponding to one string (or ground) select line and one word line may form one page. A write operation and a read operation may be performed on a page basis. Each of (or alternatively, at least one of) the memory cells in each page may store two or more bits. Bits written to the memory cells of each page may form logical pages.

The memory cell array 410 may be provided as a three-dimensional memory array. The three-dimensional memory array may be monolithically formed on one or more physical levels of arrays of the memory cells having an active area disposed on a substrate (not shown) and a circuit involved in the operation of the memory cells. The circuit involved in the operation of the memory cells may be located within or on the substrate. Being monolithically formed means that layers of each level of the three-dimensional array may be deposited directly on the lower level layers of the three-dimensional array.

Figure 5:
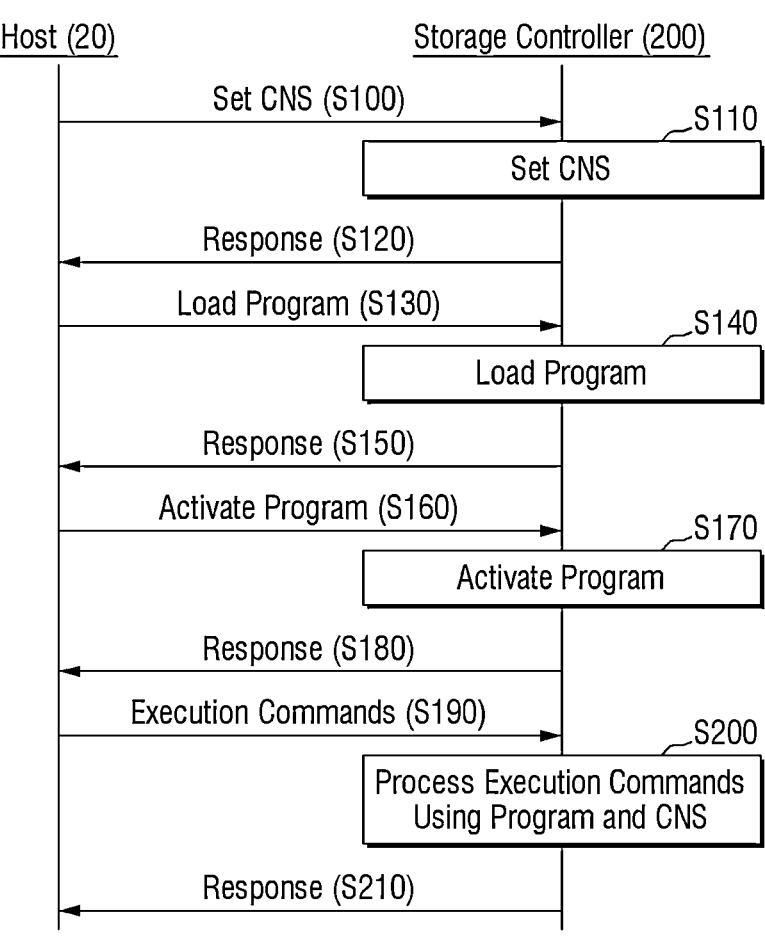
FIG. 5 is a flowchart illustrating an operation of a memory system according to some example embodiments.

FIG. 5 is a flowchart illustrating an operation of a memory system according to some example embodiments. FIGS. 6 to 9 are diagrams for explaining the operation of the memory system shown in FIG. 5.

Referring to FIGS. 1 and 5, the host device 20 transmits to the storage controller 200 a setting instruction that instructs setting of a computing namespace (CNS) for processing a command of the host device 20 (step S100).

Then, the storage controller 200 that has received the setting instruction sets the computing namespace (CNS) for processing the command of the host device 20 in the storage device 10 (step S110).

Figure 6:
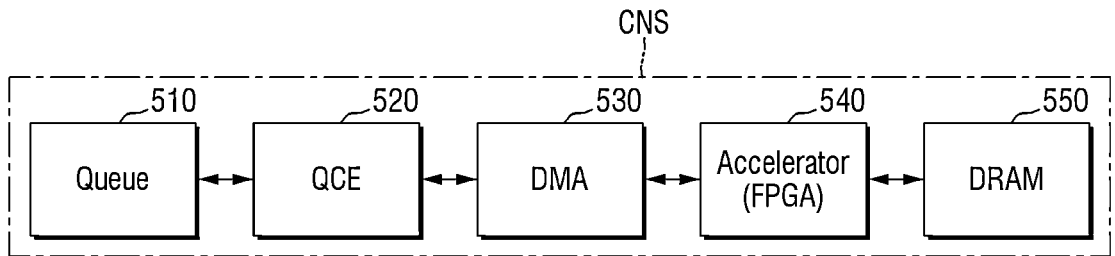
FIGS. 6 to 9 are diagrams for explaining the operation of the memory system shown in FIG. 5.

Referring to FIG. 6, in some example embodiments, the computing namespace (CNS) may include a command queue 510, a queue control engine 520, a DMA engine 530, an accelerator 540, and a buffer memory 550. However, the example embodiments are not limited thereto, and some illustrated components of the computing namespace (CNS) may be omitted, if necessary, and components that are not illustrated may be added to the computing namespace (CNS).

For example, in some example embodiments, the computing namespace (CNS) may be configured to include the command queue 510, the DMA engine 530, and the accelerator 540.

The command queue 510 may store an execution command for driving the accelerator 540 that is provided from the host device 20. In some example embodiments, the execution command may be, for example, an execution command conforming to nonvolatile memory express (NVMe) standards. In some example embodiments, the execution command may be an execution command conforming to NVMe technical proposal (TP) 4091 (NVMe TP 4091 Computational Programs Command Set Specification), but the example embodiments are not limited thereto.

The command queue 510 may sequentially store execution commands provided from the host device 20, and may output the stored execution commands in a first-in-first-out (FIFO) manner, for example.

In some example embodiments, the command queue 510 may be provided in, for example, the buffer memory 216 (see FIG. 1). In some example embodiments, the command queue 510 may be implemented by implementing the buffer memory 216 (see FIG. 1) using an SRAM, but the example embodiments are not limited thereto.

The queue control engine 520 may manage execution commands stored in the command queue 510. The queue control engine 520 may fetch the execution command stored in the command queue 510, and control the accelerator 540 to perform computation according to the fetched execution command.

When it is determined that the accelerator 540 is in an idle state or is capable of performing a computational process, the queue control engine 520 may control the accelerator 540 to process computation according to the execution command stored in the command queue 510.

In some example embodiments, the queue control engine 520 may manage the command queue 510 as a circular queue, and recognize that a new execution command has been stored when a queue index increases.

In some example embodiments, the queue control engine 520 may be implemented in the form of the queue control engine 220 in the storage controller 200 of FIG. 1, but the example embodiments are not limited thereto.

The DMA engine 530 may read or fetch data from the buffer memory 550 so that the accelerator may process computation according to an execution command. In some example embodiments, the DMA engine 530 may be implemented in the form of the DMA engine 219 in the storage controller 200 of FIG. 1, but example embodiments are not limited thereto.

The accelerator 540 may be implemented in the form of an FPGA (using an FPGA), for example, and may process computation according to an execution command under the control of the queue control engine 520. In some example embodiments, the FPGA 100 of FIG. 1 may be used to implement the accelerator 540. In some example embodiments, a plurality of accelerators 540 may be arranged, and the accelerators 540 may be used to set different computing namespaces (CNS).

The buffer memory 550 may provide data required (or alternatively, used) for the accelerator 540 to process computation according to an execution command, and may store the computational process result of the accelerator 540. In some example embodiments, the buffer memory 550 may be implemented as a DRAM, for example. In some example embodiments, the buffer memory 550 may be implemented using the buffer memory 300 of FIG. 1, but the example embodiments are not limited thereto.

Although the example embodiment in which the command queue 510, the queue control engine 520, the DMA engine 530, and the accelerator 540 are implemented in the form of hardware has been described above, the example embodiments are not limited thereto. If necessary, at least one of the command queue 510, the queue control engine 520, the DMA engine 530, and the accelerator 540 may operate while being implemented as software.

The storage controller 200 that has received the setting instruction may set required (or alternatively, used) computational resources in the storage device 10 as the computing namespace (CNS) for processing the command of the host device 20 in response to the setting instruction. The computing namespace (CNS) may be a computing namespace (CNS) conforming to the NVMe standards, but the example embodiments are not limited thereto.

Further, the computing namespace (CNS), which means a set of computational resources in the storage device 10 that are required (or alternatively, used) to process the command of the host device 20, is another concepts distinguished from a NVM namespace for dividing and managing the area of the nonvolatile memory 400 (see FIG. 1) or a memory namespace for dividing and managing the area of the buffer memory 300 (see FIG. 1).

Referring to FIGS. 1 and 5, the storage controller 200 that has completed the setting of the computing namespace (CNS) responds to the host device 20 that the setting of the computing namespace (CNS) has been completed (step S120).

Next, the host device 20 instructs the storage controller 200 to load a program to be used in the set computing namespace (CNS) (step S130). Then, in response thereto, the storage controller 200 loads the program in the set computing namespace (CNS) (step S140), and responds to the host device 20 that the loading of the program has been completed (step S150).

Figure 7:
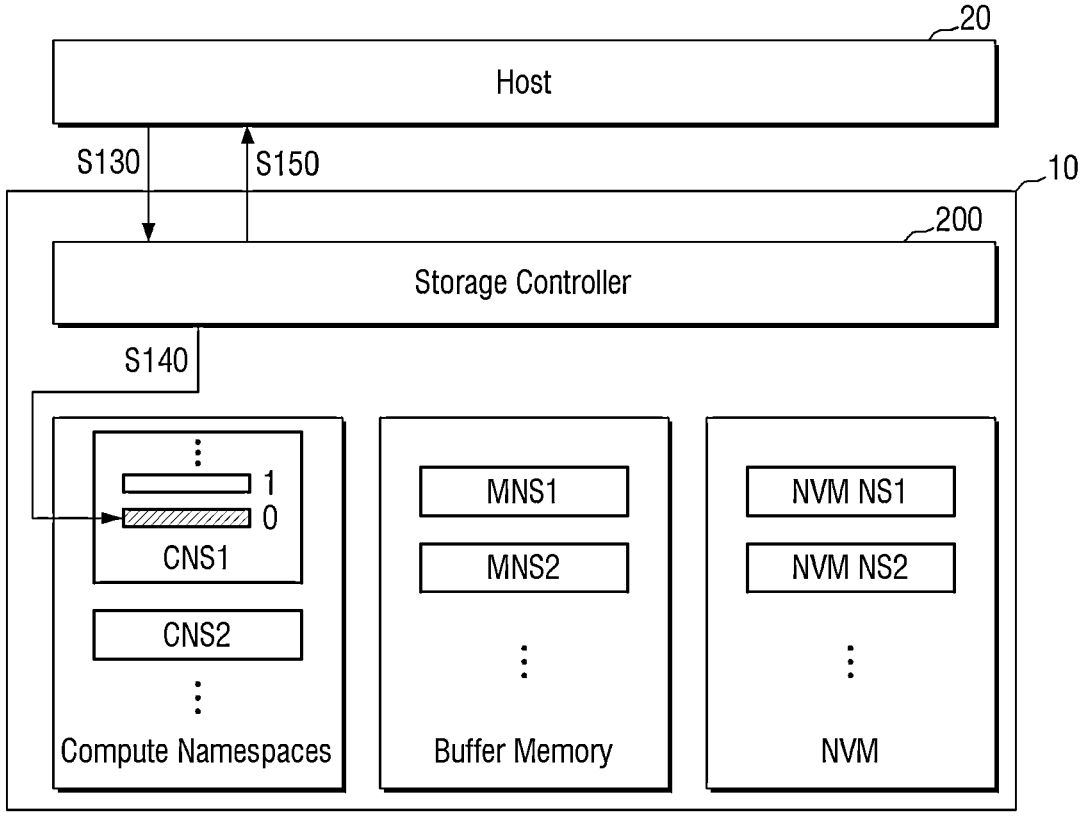

For example, referring to FIG. 7, the host device 20 instructs the storage controller 200 to load a program in slot 0 of the computing namespace CNS1 (step S130). In response thereto, the storage controller 200 loads the program in slot 0 of the computing namespace CNS1 (step S140), and responds to the host device 20 that the loading of the program has been completed (step S150).

The illustrated computing namespaces CNS1 and CNS2, which are defined using the computational resources in the storage device 10, are concepts distinguished from NVM namespaces NVM NS1 and NVM NS2 for dividing and managing the area of the nonvolatile memory NVM, or memory namespaces MNS1 and MNS2 for dividing and managing the area of the buffer memory, as described above.

Next, referring to FIGS. 1 and 5, the host device 20 instructs the storage controller 200 to activate the loaded program (step S160). In response thereto, the storage controller 200 activates the loaded program (step S170), and responds to the host device 20 that the program activation has been completed (step S180).

Figure 8:
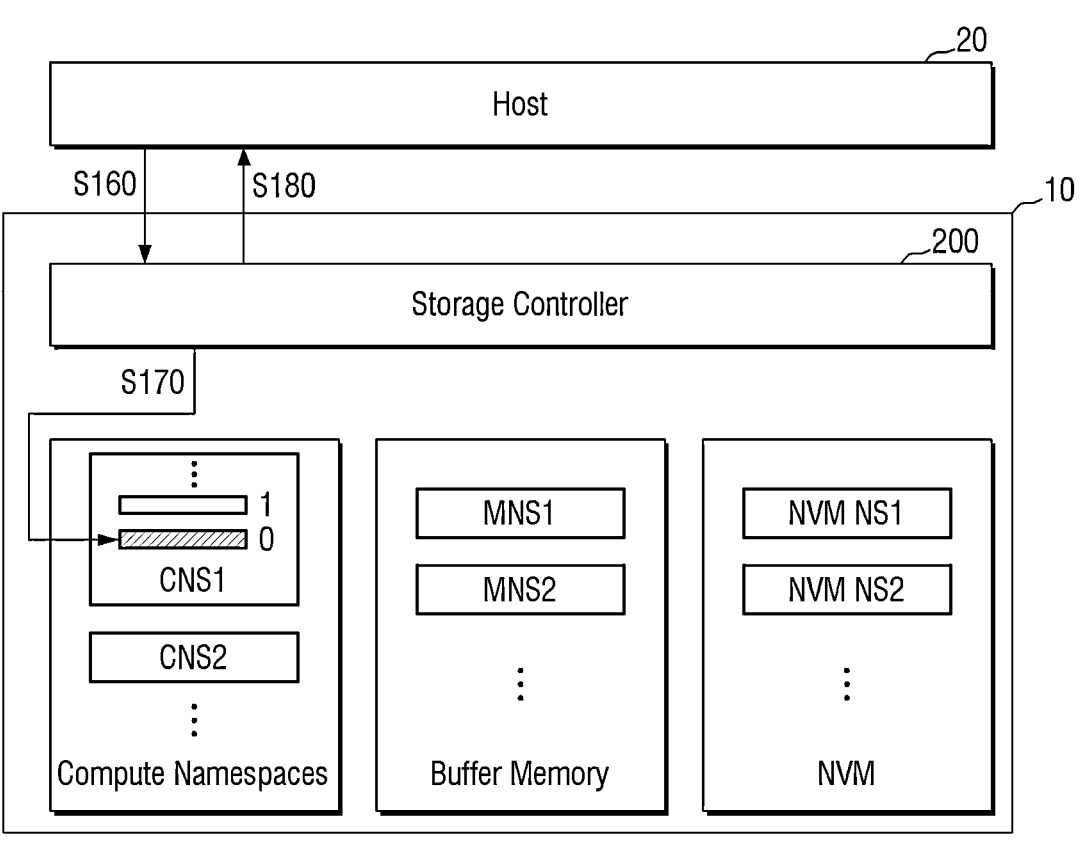

For example, referring to FIG. 8, the host device 20 instructs the storage controller 200 to activate the program loaded in slot 0 of the computing namespace CNS1 (step S160). If the program is loaded in both slot 0 and slot 1 of the computing namespace CNS1, the host device 20 may instruct the storage controller 200 to activate the program loaded in any one of slot 0 and slot 1 of the computing namespace CNS1.

In response to the instruction for activating the program loaded in slot 0 of the computing namespace CNS1, the storage controller 200 activates the program loaded in slot 0 of the computing namespace CNS1 (step S170), and responds to the host device 20 that the activation has been completed (step S180).

Next, referring to FIGS. 1 and 5, the host device 20 transmits execution commands using the activated program to the storage controller 200 (step S190). In response thereto, the storage controller 200 processes computation according to the received execution commands (step S200), and responds to the host device 20 that the computational process according to the execution commands has been completed (step S210).

Figure 9:
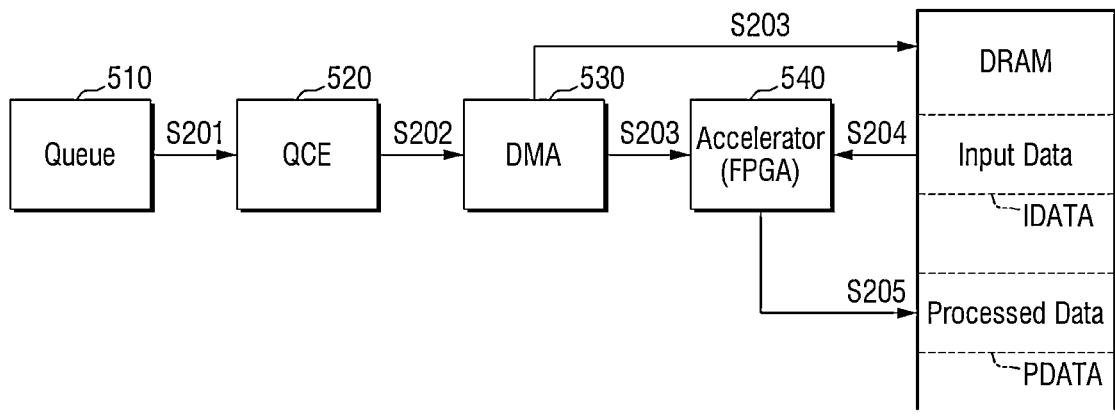

For example, referring to FIG. 9, the execution command received from the host device 20 is stored in the command queue 510, and the queue control engine 520 fetches the execution command stored in the command queue 510 (step S201).

Then, the queue control engine 520 controls the DMA engine 530 so that the accelerator 540 may process the computation according to the fetched execution command (step S202). The DMA engine 530 controls the buffer memory (that may correspond to the buffer memory 300 of FIG. 1, for example, and is referred to as "DRAM" in the following description) and the accelerator 540 (step S203), so that input data IDATA stored in the DRAM is provided to the accelerator 540 (step S204).

Thereafter, the accelerator 540 processes the computation according to the fetched execution command on the input data IDATA, and stores processed data PDATA that is the result thereof in the DRAM (step S205). At this time, the accelerator 540 may process the computation according to the fetched execution command using the program activated in the computing namespace in advance. The computation processed by the accelerator 540 may be, for example, data compression, data decompression, data filtering, data value comparison, or the like, but the example embodiments are not limited thereto.

Here, the input data IDATA stored in the DRAM may be data that is required (or alternatively, used) for a computational process and loaded in the DRAM among the data stored in the nonvolatile memory 400 (see FIG. 1). Further in some example embodiments, the processed data PDATA stored in the DRAM may be stored again in the nonvolatile memory 400 (see FIG. 1), if necessary.

Figure 10:
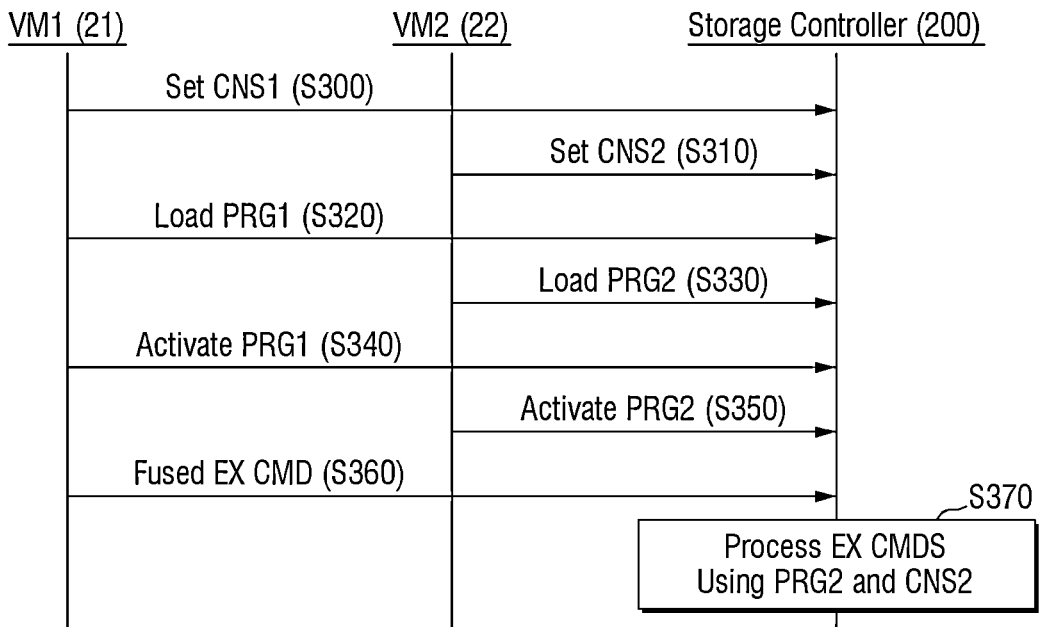
FIG. 10 is a flowchart illustrating an operation of a memory system according to some example embodiments.

FIG. 10 is a flowchart illustrating an operation of a memory system according to some example embodiments. FIGS. 11 to 14 are diagrams for explaining the operation of the memory system shown in FIG. 10.

Referring to FIGS. 1 and 10, in the present example embodiment, the host device may include a first virtual machine 21 and a second virtual machine 22. That is, in the present example embodiment, each of (or alternatively, at least one of) the virtual machines 21 and 22 may serve as a host device.

Referring to FIGS. 1 and 10, the first virtual machine 21 associated with a first tenant transmits to the storage controller 200 a setting instruction that instructs setting of the first computing namespace CNS1 for processing the command of the first virtual machine 21 (step S300).

Figure 11:
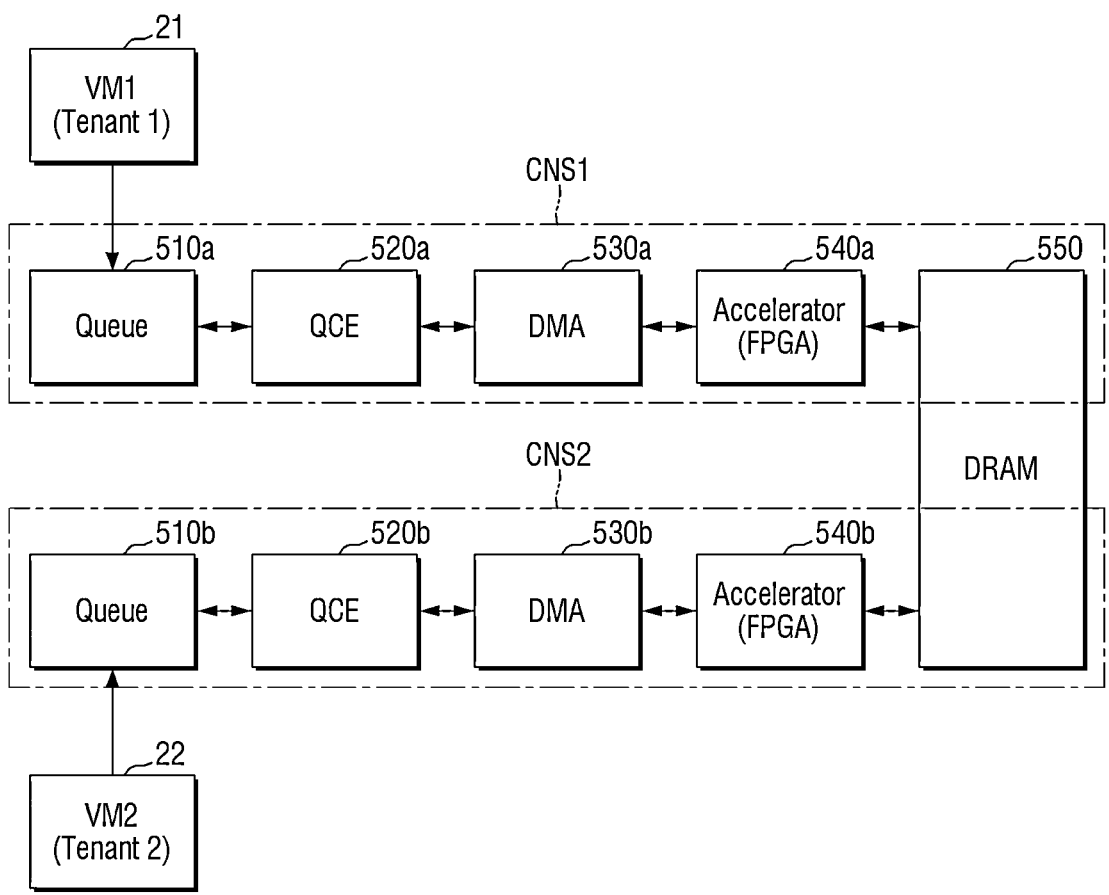

Referring to FIGS. 1 and 11, the storage controller 200 that has received the setting instruction sets the first computing namespace CNS1 for processing the command of the first virtual machine 21 in the storage device 10. In some example embodiments, the first computing namespace CNS1 may include a command queue 510a, a queue control engine 520a, a DMA engine 530a, an accelerator 540a, and a buffer memory 550.

In some example embodiments, the first computing namespace CNS1 may be set to include the command queue 510a, the DMA engine 530a, and the accelerator 540a, except the queue control engine 520a and the buffer memory 550.

At this time, the command queue 510a stores the execution commands provided from the first virtual machine 21, and the components of the first computing namespace CNS1 are used to process computation according to the execution commands received from the first virtual machine 21.

Referring to FIGS. 1 and 10, the storage controller 200 that has completed the setting of the first computing namespace CNS1 responds to the first virtual machine 21 that the setting of the first computing namespace CNS1 has been completed. Hereinafter, redundant description of the above-described response signals (steps S120, S150, S180, and S210 of FIG. 5) will be omitted for simplicity of description. Further, detailed illustration of the operations that may be sufficiently inferred from the above description with reference to FIG. 5 is omitted in FIG. 10.

Next, the second virtual machine 22 associated with a second tenant transmits to the storage controller 200 a setting instruction that instructs the setting of the second computing namespace CNS2 for processing the command of the second virtual machine 22 (step S310).

Referring to FIGS. 1 and 11, the storage controller 200 that has received the setting instruction sets the second computing namespace CNS2 for processing the command of the second virtual machine 22 in the storage device 10. In some example embodiments, the second computing namespace CNS2 may include a command queue 510b, a queue control engine 520b, a DMA engine 530b, an accelerator 540b, and a buffer memory 550.

In some example embodiments, the second computing namespace CNS2 may be set to include the command queue 510b, the DMA engine 530b, and the accelerator 540b, except the queue control engine 520b and the buffer memory 550.

At this time, the command queue 510b stores the execution commands provided from the second virtual machine 22, and the components of the second computing namespace CNS2 are used to process computation according to the execution commands received from the second virtual machine 22.

Next, referring to FIGS. 1 and 10, the first virtual machine 21 instructs the storage controller 200 to load a first program to be used in the first computing namespace CNS1 (step S320). Then, the second virtual machine 22 instructs the storage controller 200 to load a second program to be used in the second computing namespace CNS2 (step S330).

Figure 12:
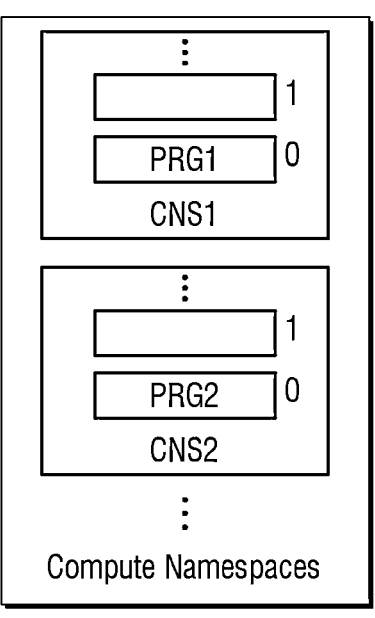

For example, referring to FIG. 12, the first virtual machine 21 may instruct the storage controller 200 to load a first program PRG1 in slot 0 of the first computing namespace CNS1, and in response thereto, the storage controller 200 may load the first program PRG1 in slot 0 of the first computing namespace CNS1, and respond to the first virtual machine 21 that the loading of the first program PRG1 has been completed.

Further, the second virtual machine 22 may instruct the storage controller 200 to load a second program PRG2 in slot 0 of the second computing namespace CNS2, and in response thereto, the storage controller 200 may load the second program PRG2 in slot 0 of the second computing namespace CNS2, and respond to the second virtual machine 22 that the loading of the second program PRG2 has been completed.

Next, referring to FIGS. 1 and 10, the first virtual machine 21 instructs the storage controller 200 to activate the first program PRG1 loaded in the first computing namespace CNS1 (step S340). Then, the second virtual machine 22 instructs the storage controller 200 to activate the second program PRG2 loaded in the second computing namespace CNS2 (step S350).

Further, for example, at least one of the first virtual machine 21 and the second virtual machine 22 transmits a fused execution command using the activated first program and second program to the storage controller 200 (step S360).

Figure 13:
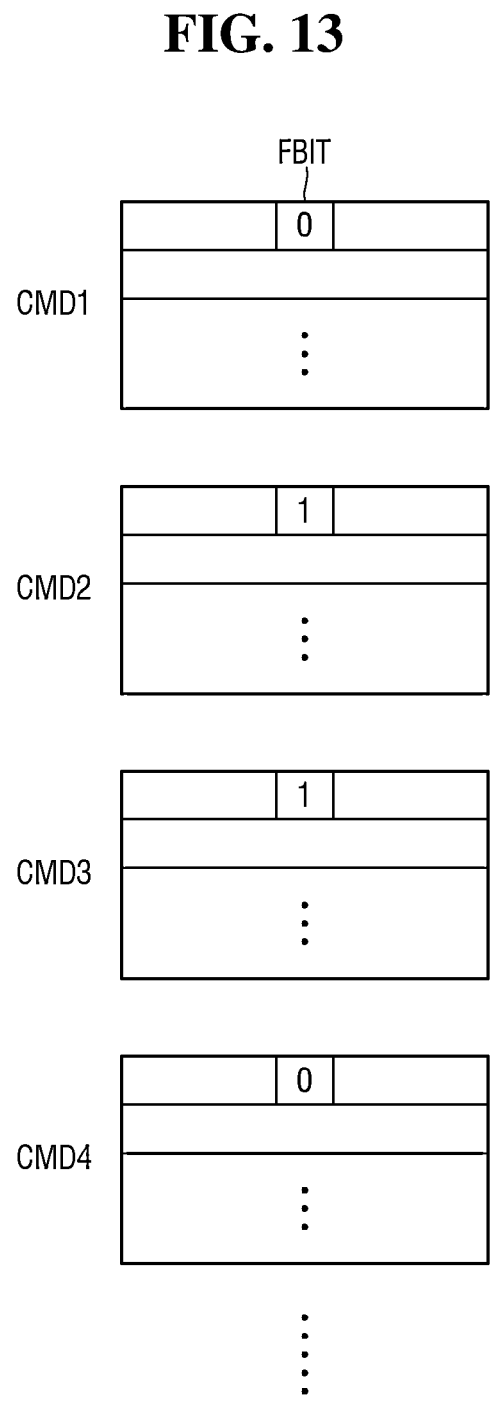

For example, referring to FIG. 13, the fused execution command may be identified by referring to a fused bit FBIT included in each of (or alternatively, at least one of) the execution commands CMD1, CMD2, CMD3, and CMD4. For example, the execution command CMD1 and the execution command CMD4 may be execution commands that are processed alone because the fused bits FBIT thereof have a bit value of 0, and the execution command CMD2 and the execution command CMD3 may be fused execution commands that are processed in association with each other because the fused bits FBIT thereof have a bit value of 1.

In some example embodiments, the fused execution command may be identified by referring to the fused bit FBIT included in each of (or alternatively, at least one of) the execution commands CMD1, CMD2, CMD3, and CMD4 in a different manner. For example, when the bit value of the fused bit FBIT of the execution command is 0, the corresponding execution command may be identified as an execution command that is processed alone, and when the bit value of the fused bit FBIT of the execution command is 1, n (n being a natural number) execution commands provided later may be recognized as fused execution commands.

That is, the fused execution command is identified simply by referring to the fused bit FBIT included in each of (or alternatively, at least one of) the execution commands CMD1, CMD2, CMD3, and CMD4, and the specific identification method thereof is not limited to the illustrated example embodiment.

The fused execution command including the execution command CMD2 and the execution command CMD3 may be the execution command that instructs (or indicates) processing of first computation using the first program PRG1 in the first computing namespace CNS1 where the computation according to the execution command CMD2 is to be processed, and then instructs, in response to the computation result thereof (the processing of the first computation using the first program PRG1), instructs (or indicates) processing of second computation using the second program PRG2 in the second computing namespace CNS2 where the computation according to the execution command CMD3 is to be processed.

For example, when the execution command CMD2 is a command related to data decryption and the execution command CMD3 is a command related to data filtering, the fused execution command including the execution command CMD2 and the execution command CMD3 may be the execution command that instructs (or indicates) the execution of data decryption using the first program PRG1 related to the data decryption in the first computing namespace CNS1, and then instructs (or indicates) the execution of filtering of the decrypted data using the second program PRG2 for filtering data according to a predetermined (or alternatively, desired) standard in the second computing namespace CNS2.

Next, referring to FIGS. 1 and 10, the storage controller 200 processes computation according to the received fused execution command using the first computing namespace CNS1 in which the first program PRG1 is activated and the second computing namespace CNS2 in which the second program PRG2 is activated (step S370).

Figure 14:
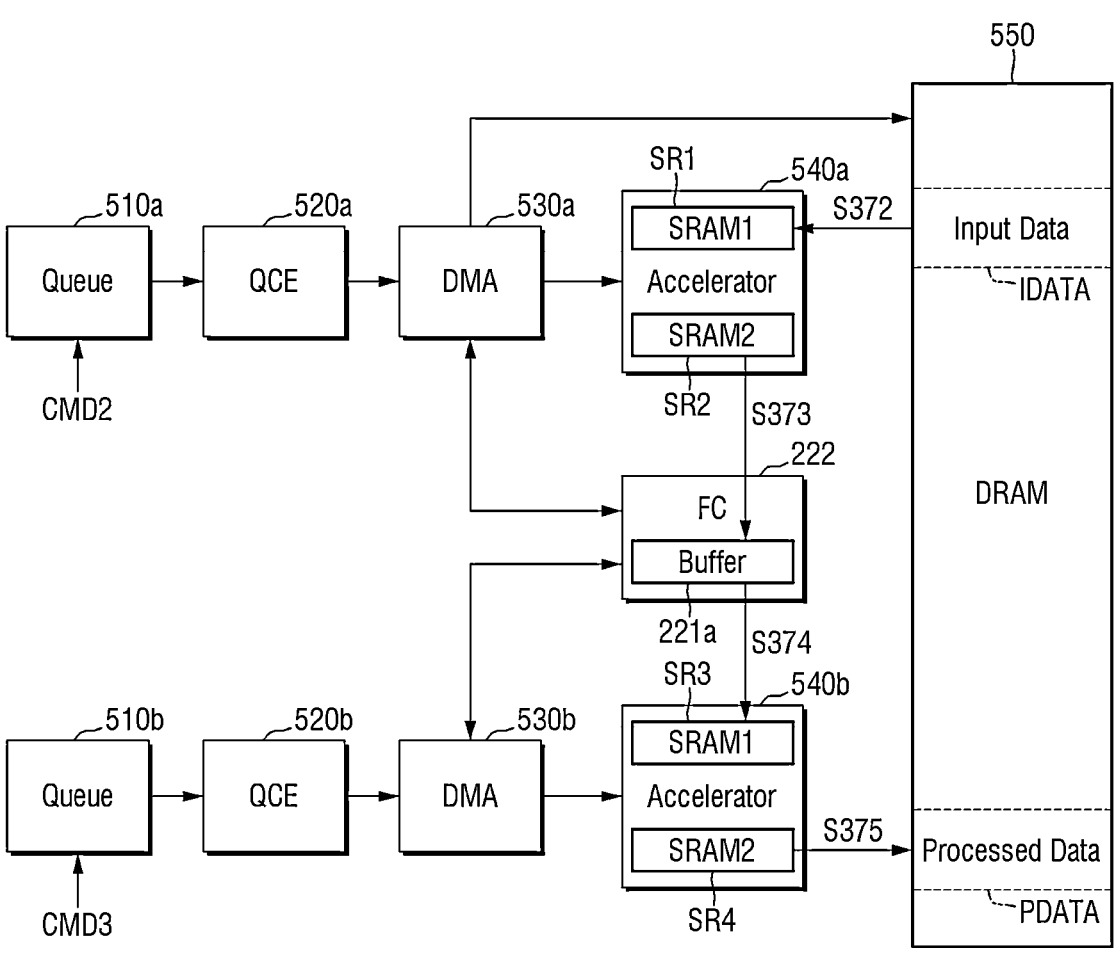

For example, referring to FIG. 14, the execution command CMD2 is stored in the command queue 510a, and the execution command CMD3 is stored in the command queue 510b.

The queue control engine 520a controls the DMA engine 530a to process computation according to the execution command CMD2 stored in the command queue 510a. Accordingly, the input data IDATA stored in the buffer memory 550 is transmitted to an input buffer SR1 of the accelerator 540a (step S372). The accelerator 540a processes computation according to the execution command CMD2 and outputs the result thereof to the output buffer SR2, and the data stored in the output buffer SR2 is transmitted to the buffer memory 221a of the flow controller 221 under the control of the DMA engine 530a, for example (step S373).

The queue control engine 520b controls the DMA engine 530b to process computation according to the execution command CMD3 stored in the command queue 510b. When the amount of data stored in the buffer memory 221a of the flow controller 221 (data subjected to computation according to the execution command CMD2) exceeds a predetermined (or alternatively, desired) range, the DMA engine 530b transmits the data stored in the buffer memory 221a of the flow controller 221 to the input buffer SR3 of the accelerator 540b (step S374). In some example embodiments, when the buffer memory 221a of the flow controller 221 is full of data, the DMA engine 530b may transfer the data stored in the buffer memory 221a of the flow controller 221 to the input buffer SR3 of the accelerator 540b. Further, in some example embodiments, when the amount of data stored in the buffer memory 221a exceeds a predetermined (or alternatively, desired) range, the flow controller 221 may transfer the data stored in the buffer memory 221a to the input buffer SR3 of the accelerator 540b.

The accelerator 540b processes computation according to the execution command CMD3 and outputs the result thereof to the output buffer SR4, and the data stored in the output buffer SR4 is stored in the form of the processed data PDATA in the buffer memory 550 under the control of the DMA engine 530b, for example (step S375).

For example, when the execution command CMD2 is a data decryption command and the execution command CMD3 is a data filtering command, the encrypted input data IDATA stored in the buffer memory 550 (the input data may be, for example, data transmitted from the nonvolatile memory 400 (see FIG. 1)) may be stored in the buffer memory 221a of the flow controller 221 while being decrypted by the accelerator 540a, and the decrypted data may be filtered according to a predetermined (or alternatively, desired) standard by the accelerator 540b and the decrypted and filtered data may be stored in the form of the processed data PDATA in the buffer memory 550.

In some example embodiments, the buffer memory 550 may include a DRAM. The input buffer SR1 and the output buffer SR2 of the accelerator 540a, the input buffer SR3 and the output buffer SR4 of the accelerator 540b, and the buffer memory 221a of the flow controller 221 may include an SRAM. However, the example embodiments of the present disclosure are not limited thereto.

Figure 15:
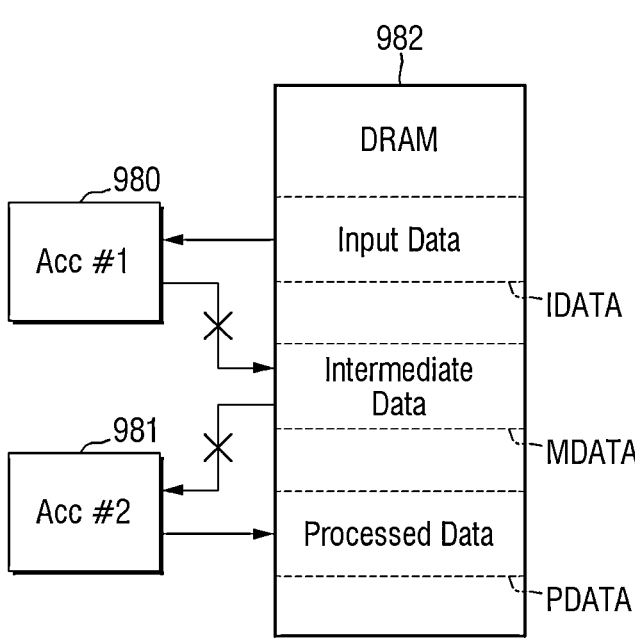
FIG. 15 is a diagram illustrating effects of a memory system according to some example embodiments.

FIG. 15 is a diagram illustrating effects of a memory system according to some example embodiments.

FIG. 15 is a diagram illustrating an operation of processing computation according to a fused execution command in a memory system different from the above-described memory system. Referring to FIG. 15, in a memory system different from the above-described memory system, after the input data IDATA stored in a buffer memory 982 is subjected to processing according to the first computation by the accelerator (ACC #1) 980, the result thereof is stored in the form of intermediate data MDATA in the buffer memory 982. Further, after the intermediate data MDATA stored in the buffer memory 982 is subjected to processing according to the second computation by the accelerator (ACC #2) 981, the result thereof is stored in the form of the processed data PDATA in the buffer memory 982. That is, if the number of execution commands included in the fused execution command is m (m being a natural number greater than or equal to 2), at least 2 m accesses to the buffer memory 982 including a DRAM are required (or alternatively, used).

The excessive accesses to the buffer memory 982 may adversely affect the computational performance of the computational storage device, thereby deteriorating the operation performance of the computational storage device. On the other hand, in the computational storage device according to the present example embodiment, there is no need to be stored in the form of the intermediate data MDATA in the buffer memory 982 or read the intermediate data MDATA from the buffer memory 982, so that the operation performance of the computational storage device may be improved.

FIGS. 16 to 19 are diagrams for describing an operation of a memory system according to some example embodiments. In the following description, redundant description of the above-described example embodiment will be omitted while focusing on differences.

Figure 16:
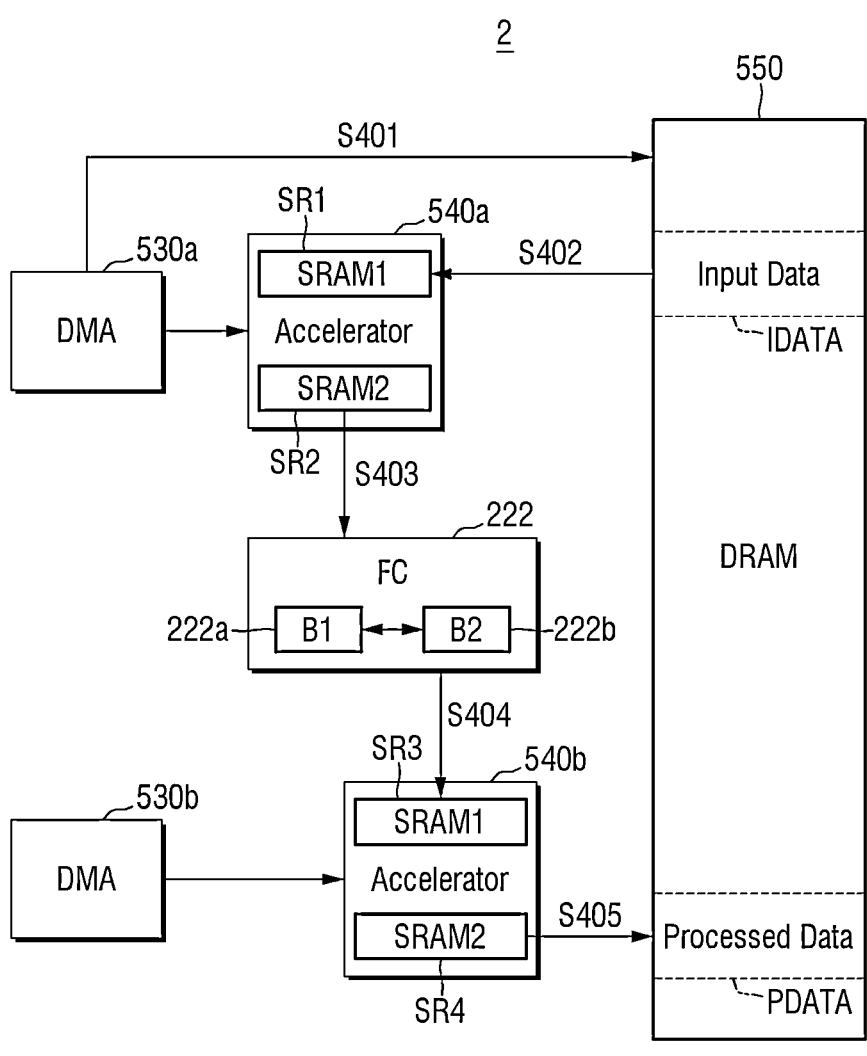
FIGS. 16 to 19 are diagrams for describing an operation of a memory system according to some example embodiments.

Referring to FIG. 16, the flow controller 222 of the memory system 2 according to the present example embodiment may include a first buffer memory 222a and a second buffer memory 222b.

The operation of the memory system 2 will be described as follows.

Figure 17:
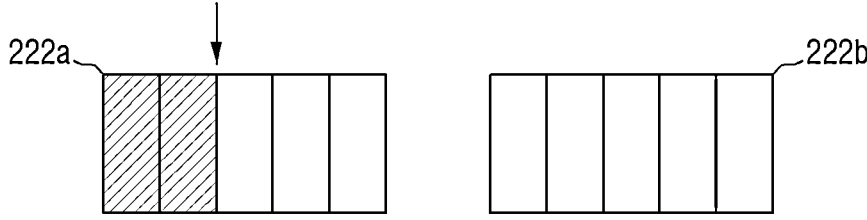

The DMA engine 530a controls the buffer memory 550 (step S401), and the input data IDATA stored in the buffer memory 550 is transmitted to the input buffer SR1 of the accelerator 540a (step S402). The accelerator 540a processes the computation according to the first execution command on the data stored in the input buffer SR1 and outputs the result thereof to the output buffer SR2, and the data stored in the output buffer SR2 is transmitted to the first buffer memory 222a of the flow controller 222 under the control of the DMA engine 530a (step S403). Accordingly, as shown in FIG. 17, data is sequentially stored in the first buffer memory 222a.

Figure 18:
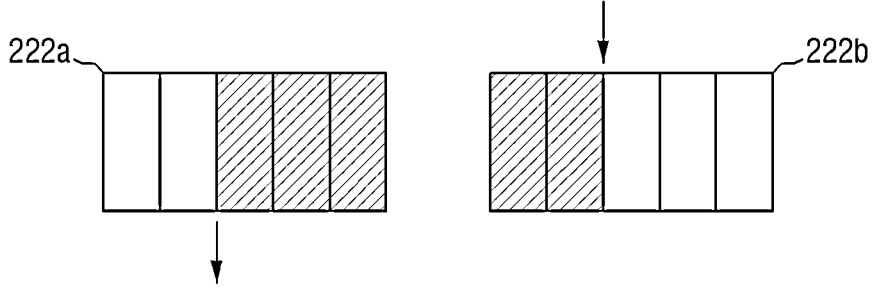

When the amount of data stored in the first buffer memory 222a exceeds a predetermined (or alternatively, desired) range (for example, when the first buffer memory 222a is full), the DMA engine 530a or the flow controller 222 transmits the data stored in the first buffer memory 222a to the input buffer SR3 of the accelerator 540b (step S404). At the same time, the data stored in the output buffer SR2 of the accelerator 540a is transmitted to the second buffer memory 222b of the flow controller 222 under the control of the DMA engine 530a, for example. That is, as shown in FIG. 18, the operation of transmitting the data stored in the first buffer memory 222a to the input buffer SR3 of the accelerator 540b, and the operation of storing the data transmitted from the output buffer SR2 of the accelerator 540a in the second buffer memory 222b may be simultaneously or contemporaneously performed.

Figure 19:
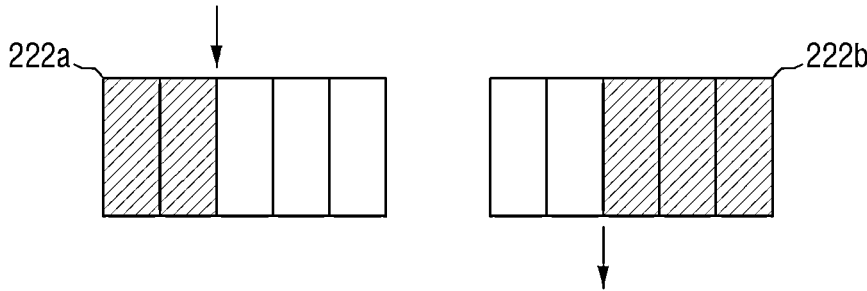

Thereafter, if the amount of data stored in the second buffer memory 222b exceeds a predetermined (or alternatively, desired) range (for example, if the second buffer memory 222b is full), the DMA engine 530a or the flow controller 222 transmits the data stored in the buffer memory 222b to the input buffer SR3 of the accelerator 540b. At the same time, the data stored in the output buffer SR2 of the accelerator 540a is transmitted to the first buffer memory 222a of the flow controller 222 under the control of the DMA engine 530a, for example. That is, as shown in FIG. 19, the operation of transmitting the data stored in the second buffer memory 222b to the input buffer SR3 of the accelerator 540b, and the operation of storing the data transmitted from the output buffer SR2 of the accelerator 540a in the first buffer memory 222a may be simultaneously or contemporaneously performed.

Next, the accelerator 540b processes the computation according to the second execution command on the data stored in the input buffer SR3 and outputs the result thereof to the output buffer SR4, and the data stored in the output buffer SR4 is stored in the form of the processed data PDATA in the buffer memory 550 under the control of the DMA engine 530b, for example (step S405).

That is, in the present example embodiment, the data is transferred while switching the first and second buffer memories 222a and 222b of the flow controller 222, so that it is possible to perform a required (or alternatively, used) operation within a short time with a smaller amount than an actually required (or alternatively, used) buffer memory amount.

Figure 20:
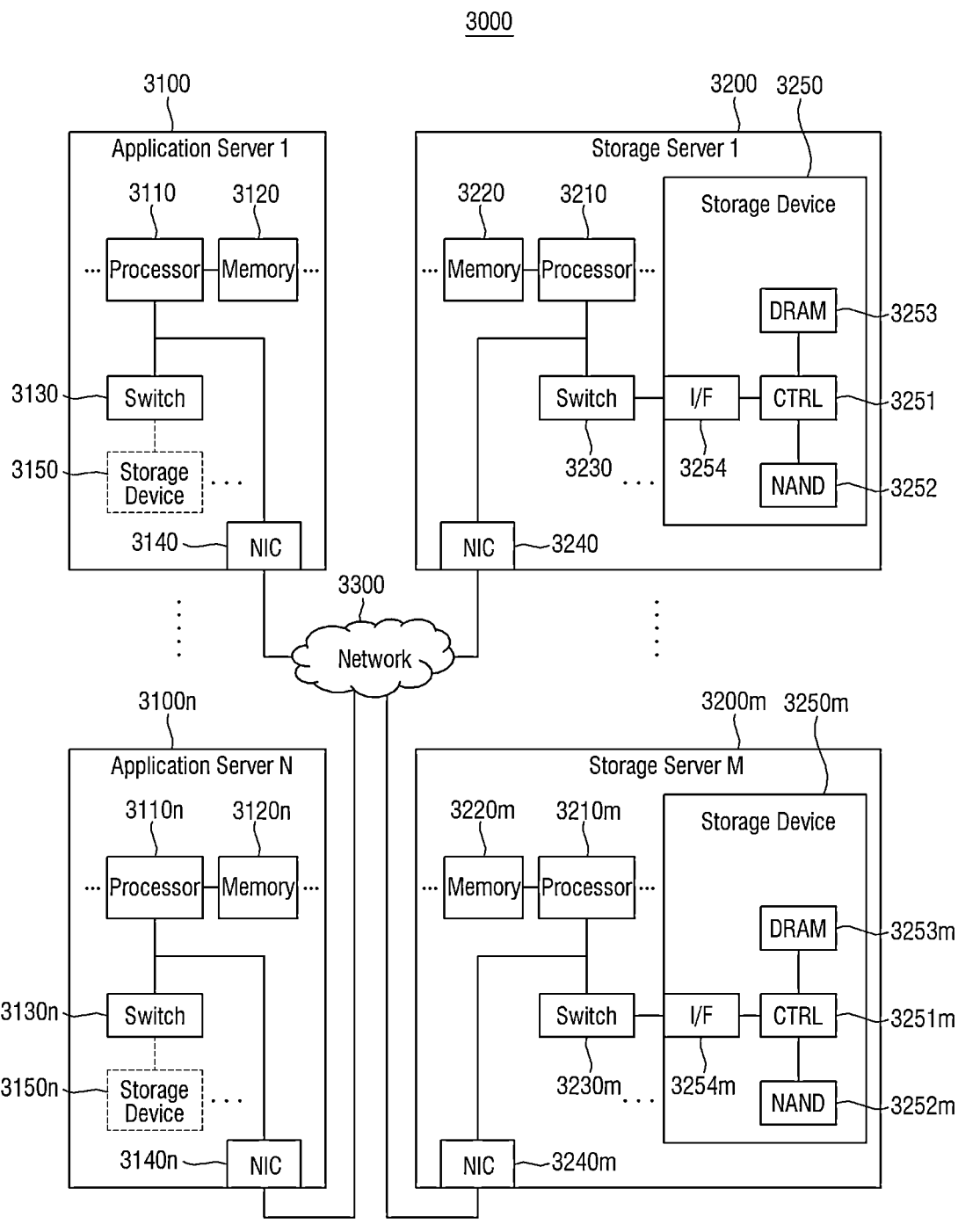
FIG. 20 is a diagram of a data center including a storage device according to some example embodiments.

FIG. 20 is a diagram of a data center including a storage device according to some example embodiments.

Referring to FIG. 20, a data center 3000 is a facility that collects various types of data and provides services, and may be referred to as a data storage center. The data center 3000 may be a system for operating a search engine and a database, or may be a computing system used in a government institution or a company such as a bank. The data center 3000 may include application servers 3100 to 3100n and storage servers 3200 to 3200m. The number of application servers 3100 to 3100n and the number of storage servers 3200 to 3200m may be variously selected according to some example embodiments, and the number of application servers 3100 to 3100n and the number of storage servers 3200 to 3200m may be different from each other.

The application server 3100 or the storage server 3200 may include at least one of processors 3110 and 3210 and memories 3120 and 3220. When describing the storage server 3200 as an example, the processor 3210 may control the overall operation of the storage server 3200, and access the memory 3220 to execute instructions and/or data loaded in the memory 3220. The memory 3220 may be a double data rate synchronous DRAM (DDR SDRAM), a high bandwidth memory (HBM), a hybrid memory cube (HMC), a dual in-line memory module (DIMM), an Optane DIMM, and/or a nonvolatile DIMM (NVMDIMM). According to an example embodiment, the number of the processors 3210 and the number of the memories 3220 included in the storage server 3200 may be variously selected. In one example embodiment, the processor 3210 and the memory 3220 may be provided as a processor-memory pair. In one example embodiment, the number of processors 3210 and the number of memories 3220 may be different. The processor 3210 may include a single core processor or a multiple core processor. The above description of the storage server 3200 may be similarly applied to the application server 3100. According to an example embodiment, the application server 3100 may not include the storage device 3150. The storage server 3200 may include at least one storage device 3250. The number of storage devices 3250 included in the storage server 3200 may be variously selected according to some example embodiments.

In some example embodiments, the storage device 3250 may include the storage device 10 described with reference to FIGS. 1 to 19.

The application servers 3100 to 3100n and the storage servers 3200 to 3200m may communicate with each other through the network 3300. The network 3300 may be implemented using a Fiber Channel (FC), Ethernet, or the like. In this case, FC is a medium used for relatively high-speed data transmission, and an optical switch that provides high performance/high availability may be used. The storage servers 3200 to 3200m may be provided as file storage, block storage, or object storage according to an access method of the network 3300.

In one example embodiment, the network 3300 may be a storage-only network such as a storage area network (SAN). As one example, the SAN may an FC-SAN that uses an FC network and is implemented according to FC Protocol (FCP). For another example, the SAN may be an IP-SAN that uses a TCP/IP network and is implemented according to an iSCSI (SCSI over TCP/IP or Internet SCSI) protocol. In another example embodiment, the network 3300 may be a general network such as the TCP/IP network. For example, the network 3300 may be implemented according to a protocol such as FC over Ethernet (FCOE), network attached storage (NAS), NVMe over Fabrics (NVMe-oF), or the like.

Hereinafter, a description will be given focusing on the application server 3100 and the storage server 3200. The description of the application server 3100 may also be applied to another application server 3100n, and the description of the storage server 3200 may also be applied to another storage server 3200m.

The application server 3100 may store data requested to be stored by a user or a client in one of the storage servers 3200 to 3200m through the network 3300. In addition, the application server 3100 may acquire data requested to be read by a user or a client from one of the storage servers 3200 to 3200m through the network 3300. For example, the application server 3100 may be implemented as a web server, a database management system (DBMS), or the like.

The application server 3100 may access a memory 3120n or a storage device 3150n included in another application server 3100n through the network 3300, or may access the memories 3220 to 3220m or the storage devices 3250 to 3250m included in the storage servers 3200 to 3200m through the network 3300. Accordingly, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. At this time, the data may be transferred from the storage devices 3250 to 3250m of the storage servers 3200 to 3200m to the memories 3120 to 3120n of the application servers 3100-3100n directly or through the memories 3220 to 3220m of the storage servers 3200 to 3200m. Data moving through the network 3300 may be encrypted data for security or privacy.

Referring to the storage server 3200 as an example, an interface 3254 may provide a physical connection between the processor 3210 and a controller 3251 and a physical connection between a Network InterConnect (NIC) 3240 and the controller 3251. For example, the interface 3254 may be implemented in a direct attached storage (DAS)

method in which the storage device 3250 is directly connected with a dedicated cable. In addition, for example, the interface 3254 may be implemented as various types of interfaces, such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), and/or compact flash (CF) card.

The storage server 3200 may further include a switch 3230 and the NIC 3240. The switch 3230 may selectively connect the processor 3210 to the storage device 3250 or may selectively connect the NIC 3240 to the storage device 3250 under the control of the processor 3210.

In one example embodiment, the NIC 3240 may include a network interface card, a network adapter, or the like. The NIC 3240 may be connected to the network 3300 through a wired interface, a wireless interface, a Bluetooth interface, an optical interface, or the like. The NIC 3240 may include an internal memory, a digital signal processor (DSP), a host bus interface, or the like, and may be connected to the processor 3210 and/or the switch 3230 through the host bus interface. The host bus interface may be implemented as one of the examples of the interface 3254 described above. In one example embodiment, the NIC 3240 may be integrated with at least one of the processor 3210, the switch 3230, and the storage device 3250.

In the storage servers 3200 to 3200m or the application servers 3100 to 3100n, the processor may send a command to the storage devices 3150 to 3150n, 3250 to 3250m or the memories 3120 to 3120n, 3220 to 3220m to program or read data. In this case, the data may be data that has been error-corrected through an error correction code (ECC) engine. The data may be data that has been processed by data bus inversion (DBI) or data masking (DM), and may include cyclic redundancy code (CRC) information. The data may be encrypted data for security or privacy.

The storage devices 3150 to 3150n and 3250 to 3250m may transmit a control signal and a command/address signal to NAND flash memory devices 3252 to 3252m in response to a read command received from the processor. Accordingly, when data is read from the NAND flash memory device 3252 to 3252m, a read enable (RE) signal may serve to be inputted as a data output control signal and to output data to the DQ bus. The data strobe signal (DQS) may be generated by using the RE signal. The command and address signals may be latched in the page buffer according to the rising edge or falling edge of a write enable (WE) signal.

The controller 3251 may overall control the operation of the storage device 3250. In one example embodiment, the controller 3251 may include a static random access memory (SRAM). The controller 3251 may write data to the NAND flash 3252 in response to a write command, or read data from the NAND flash 3252 in response to a read command. For example, the write command and/or the read command may be provided from the processor 3210 in the storage server 3200, the processor 3210m in another storage server 3200m, or the processors 3110 to 3110n in the application servers 3100 to 3100n. The DRAM 3253 may temporarily store (buffer) data to be written to the NAND flash 3252 or data read from the NAND flash 3252. In addition, the DRAM 3253 may store metadata. Here, the metadata is data generated by the controller 3251 to manage the user data or the NAND flash 3252. The storage device 3250 may include a secure element (SE) for security or privacy.

Any of the elements and/or functional blocks disclosed above may include or be implemented in processing circuitry such as hardware including logic circuits; a hardware/software combination such as a processor executing software; or a combination thereof. For example, the package manager 215, the host controller 201, the control logic 450, the storage controller 200, Accelerator 540, the processor 3110, 3210, and controller 3251 may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

In concluding the detailed description, those skilled in the art will appreciate that many variations and modifications can be made to the preferred example embodiments without substantially departing from the principles of the present disclosure. Therefore, the disclosed preferred example embodiments of the invention are used in a generic and descriptive sense only and not for purposes of limitation.

What is claimed is:

1. A method for operating a computational storage device, comprising:

receiving, by a storage controller, a first computing namespace setting instruction from a first host device;

receiving, by the storage controller, a second computing namespace setting instruction from a second host device;

receiving, by the storage controller, a first program from the first host device;

receiving, by the storage controller, a second program from the second host device;

receiving, by the storage controller, a fused execution command, the fused execution command indicating to process a first computation using the first program in the first computing namespace and indicating to, in response to a first computation result of processing the first computation, process a second computation using the second program in the second computing namespace;

processing, by a first accelerator, the first computation;

storing, by the storage controller, in a buffer memory the first computation result obtained by processing the first computation;

providing, by the storage controller, data stored in the buffer memory to a second accelerator different from the first accelerator, in response to an amount of data stored in the buffer memory exceeding a range; and processing, by the second accelerator, the second computation on the data provided from the buffer memory.

2. The method of claim 1, further comprising:

providing, by the storage controller, input data from a dynamic random access memory (DRAM) to the first accelerator; and storing, by the storage controller, a second computation result obtained by processing the second computation in the DRAM, wherein the storing in the buffer memory of the first computation result obtained by processing the first computation comprises storing the first computation result obtained by processing the first computation in the buffer memory separated from the DRAM.

3. The method of claim 2, wherein the buffer memory comprises a static random access memory (SRAM).

4. The method of claim 2, wherein the buffer memory is in the storage controller.

5. The method of claim 2, wherein the first accelerator comprises a first input buffer and a first output buffer, the input data is provided to the first input buffer from the DRAM, and the first computation result obtained by processing the first computation is provided to the buffer memory from the first output buffer.

6. The method of claim 5, wherein the second accelerator comprises a second input buffer and a second output buffer, the data stored in the buffer memory is provided to the second input buffer from the buffer memory, and the second computation result obtained by processing the second computation is provided to the DRAM from the second output buffer.

7. The method of claim 6, wherein each of the first and second input buffers comprises an SRAM, and each of the first and second output buffers comprises an SRAM.

8. The method of claim 1, wherein the buffer memory comprises a first buffer memory and a second buffer memory, and the providing of the data stored in the buffer memory to the second accelerator, in response to the amount of data stored in the buffer memory exceeding the range comprises, in response to an amount of data stored in the first buffer memory exceeding the range, providing data stored in the first buffer memory to the second accelerator, and simultaneously storing in the second buffer memory the first computation result obtained by processing the first computation.

9. The method of claim 8, wherein the providing of the data stored in the buffer memory to the second accelerator, in response to the amount of data stored in the buffer memory exceeding the range further comprises, in response to an amount of data stored in the second buffer memory exceeding the range, providing data stored in the second buffer memory to the second accelerator, and simultaneously storing in the first buffer memory the first computation result obtained by processing the first computation.

10. The method of claim 1, wherein the fused execution command is an execution command conforming to nonvolatile memory express (NVMe) standards.

11. A computational storage device comprising:

a nonvolatile memory configured to store data;

a storage controller configured to control the nonvolatile memory;

a first accelerator comprised in a first computing namespace, and configured to process a first computation according to a first execution command received from a first host device on the data by using a first program provided from the first host device; and a second accelerator comprised in a second computing namespace, and configured to process a second computation according to a second execution command received from a second host device on the data by using a second program provided from the second host device, wherein the storage controller is configured to receive a fused execution command, the fused execution command indicating to process the first computation using the first program in the first computing namespace and indicating to, in response to a first computation result of processing the first computation, process the second computation using the second program in the second computing namespace, control the first accelerator such that the first computation is processed on the data, store in a buffer memory the first computation result obtained by processing the first computation, provide data stored in the buffer memory to the second accelerator, in response to an amount of data stored in the buffer memory exceeding a range, and control the second accelerator such that the second computation is processed on the data stored in the buffer memory.

12. The computational storage device of claim 11, further comprising a DRAM configured to store at least a part of the data stored in the nonvolatile memory and separated from the buffer memory, wherein the storage controller is configured to control the first accelerator such that the first computation is processed on the data stored in the DRAM, control the second accelerator such that the second computation is processed on the data stored in the buffer memory, and store in the DRAM a second computation result obtained by processing the second computation.

13. The computational storage device of claim 12, wherein the buffer memory comprises an SRAM in the storage controller.

14. The computational storage device of claim 12, wherein the first accelerator comprises a first input buffer and a first output buffer, the second accelerator comprises a second input buffer and a second output buffer, the data stored in the DRAM is provided to the first input buffer from the DRAM, the first computation result obtained by processing the first computation is provided to the buffer memory from the first output buffer, the data stored in the buffer memory is provided to the second input buffer from the buffer memory, and the second computation result obtained by processing the second computation is provided to the DRAM from the second output buffer.

15. The computational storage device of claim 14, wherein each of the first and second input buffers comprises an SRAM, and each of the first and second output buffers comprises an SRAM.

16. The computational storage device of claim 11, wherein the buffer memory comprises a first buffer memory and a second buffer memory, and the storage controller is configured to, in response to an amount of data stored in the first buffer memory exceeding the range, provide data stored in the first buffer memory to the second accelerator, and simultaneously store in the second buffer memory the first computation result obtained by processing the first computation, and in response to an amount of data stored in the second buffer memory exceeding the range, provide data stored in the second buffer memory to the second accelerator, and simultaneously store in the first buffer memory the first computation result obtained by processing the first computation.

17. A computational storage device comprising:

a nonvolatile memory configured to store data;

a storage controller configured to control the nonvolatile memory;

a first accelerator in a first computing namespace, and configured to process a first computation according to a first execution command received from a first host device on the data by using a first program provided from the first host device;

a second accelerator in a second computing namespace, and configured to process a second computation according to a second execution command received from a second host device on the data by using a second program provided from the second host device; and a volatile memory configured to store at least a part of data stored in the nonvolatile memory, wherein the storage controller is configured to receive a fused execution command, the fused execution command indicating to process the first computation using the first program in the first computing namespace and indicating to, in response to a first computation result of processing the first computation, process the second computation using the second program in the second computing namespace, control the first accelerator such that the first computation is processed on the data stored in the volatile memory, store the first computation result obtained by processing the first computation in a buffer memory different from the volatile memory, provide data stored in the buffer memory to the second accelerator, in response to an amount of data stored in the buffer memory exceeding a range, control the second accelerator such that the second computation is processed on the data stored in the buffer memory, and store in the volatile memory a computation result obtained by processing the second computation.

18. The computational storage device of claim 17, wherein the volatile memory comprises a DRAM, and the buffer memory comprises an SRAM in the storage controller.

19. The computational storage device of claim 17, wherein the buffer memory comprises a first buffer memory and a second buffer memory, and the storage controller is configured to, in response to an amount of data stored in the first buffer memory exceeding the range, provide data stored in the first buffer memory to the second accelerator, and simultaneously store in the second buffer memory the computation result obtained by processing the first computation, and in response to an amount of data stored in the second buffer memory exceeding the range, provide data stored in the second buffer memory to the second accelerator, and simultaneously store in the first buffer memory the computation result obtained by processing the first computation.

20. The computational storage device of claim 17, wherein the fused execution command is an execution command conforming to nonvolatile memory express (NVMe) standards.

\* \* \* \* \*